United States Patent [19]

Augenbraun et al.

[11] Patent Number: 5,444,575
[45] Date of Patent: Aug. 22, 1995

[54] METHOD FOR RECORDING DIGITAL DATA USING A SET OF HEADS INCLUDING A PAIR OF CO-LOCATED HEADS TO RECORD DATA AT A RATE LOWER THAN THE FULL RECORDING RATE POSSIBLE USING THE SET OF HEADS

[75] Inventors: Joseph E. Augenbraun, Princeton; Jill M. Boyce, East Windsor, both of N.J.; Larry A. Pearlstein, Newtown, Pa.

[73] Assignee: Hitachi America, Ltd., Tarrytown, N.Y.

[21] Appl. No.: 184,716

[22] Filed: Jan. 21, 1994

[51] Int. Cl.[6] .......... G11B 15/14; G11B 21/4; H04N 5/78; H04N 5/76
[52] U.S. Cl. .......... 360/64; 360/103; 360/70; 358/335
[58] Field of Search .......... 358/335, 310, 312, 324, 358/330, 341, 342; 348/390, 384, 397, 409, 419, 487, 725, 729, 701; 360/10.1, 10.2, 10.3, 22, 32, 33.1, 72.1, 72.2, 75, 77.16, 84, 101, 105, 71, 70

[56] References Cited

U.S. PATENT DOCUMENTS

| | | | |
|---|---|---|---|
| 3,934,268 | 1/1976 | Uemura | 360/101 |
| 4,031,548 | 6/1977 | Kato et al. | 348/725 |
| 4,139,867 | 2/1979 | Foerster | 360/10.3 |
| 4,193,098 | 3/1980 | Bixby et al. | 360/10.3 |
| 4,263,623 | 4/1981 | Woo et al. | 360/10.3 |
| 4,290,087 | 9/1981 | Bixby et al. | 360/33.1 |
| 4,339,775 | 7/1982 | Lemke et al. | 360/10.3 |
| 4,355,324 | 10/1982 | Reitmeier | 358/312 |
| 4,392,162 | 5/1983 | Yamamoto | 360/10.3 |
| 4,504,869 | 3/1985 | Warren | 358/312 |
| 4,510,538 | 4/1985 | Sato et al. | 360/84 |
| 4,541,020 | 9/1985 | Kimura | 360/22 |
| 4,558,376 | 12/1985 | Heitmann | 360/10.1 |
| 4,584,613 | 4/1986 | Amari et al. | 358/310 |
| 4,636,874 | 1/1987 | Hoogendoorn et al. | 360/10.2 |
| 4,636,879 | 1/1987 | Narita et al. | 360/72.2 |
| 4,668,998 | 5/1987 | Aoki | 360/10.3 |
| 4,783,707 | 11/1988 | Nemoto et al. | 360/105 |
| 4,807,053 | 2/1989 | Heijnemans | 358/335 |
| 4,825,301 | 4/1989 | Pape et al. | 358/335 |
| 4,887,169 | 12/1989 | Bannai et al. | 358/335 |
| 4,910,605 | 3/1990 | Sasaki et al. | 358/310 |
| 4,985,781 | 1/1991 | Hirasawa | 358/324 |
| 5,027,235 | 6/1991 | Furuyama | 360/77.16 |
| 5,047,869 | 9/1991 | Aoki et al. | 358/341 |
| 5,050,014 | 9/1991 | Maeda et al. | 360/75 |
| 5,065,259 | 11/1991 | Kubota et al. | 360/32 |

(List continued on next page.)

OTHER PUBLICATIONS

Lew B. Stelmach and Wa James Tam, "Viewing-based Image Coding For Advanced Television Systems", International Workshop on HDTV (1993).

(List continued on next page.)

Primary Examiner—Aristotelis Psito
Assistant Examiner—Patrick Wamsley
Attorney, Agent, or Firm—Kenyon & Kenyon

[57] ABSTRACT

Method for increasing the recording time of a digital video tape recorder ("VTR") and for supporting multiple normal play modes of digital VTR operation, e.g., a standard play mode of operation and one or more long play modes of operation. To achieve long play mode operation data reduction is performed on a received full rate video data stream to generate a reduced rate video data stream. Data reduction is performed using data prioritization and selection, requantization of full rate data stream, and/or by selecting data to be included in the reduced rate data stream as a function of what portion of a video frame the data represents. The reduced rate data stream is generated to be compliant with the data format of the full rate data stream. During long play mode recording operation the data in the reduced rate data stream is recorded on a tape at the same tape data density as used during standard mode VTR operation. In accordance with each of the recording methods of the present invention the rotational rate of the digital VTRs headwheel is the same for both standard and long play modes of VTR operation. In addiction, the present invention is directed to several methods of reading data from a tape at a reduced data rate.

14 Claims, 7 Drawing Sheets

U.S. PATENT DOCUMENTS

| | | | |
|---|---|---|---|
| 5,097,363 | 3/1992 | Takei et al. | 360/10.3 |
| 5,119,208 | 6/1992 | Fujimoto | 358/310 |
| 5,126,852 | 6/1992 | Nishino et al. | 358/335 |
| 5,132,807 | 7/1992 | Takimoto et al. | 358/335 |
| 5,134,464 | 7/1992 | Basile et al. | 348/487 |
| 5,136,391 | 8/1992 | Minami | 358/310 |
| 5,136,394 | 8/1992 | Haikawa et al. | 358/335 |
| 5,140,417 | 8/1992 | Tanaka et al. | 348/384 |
| 5,140,437 | 8/1992 | Yonemitsu et al. | 358/342 |
| 5,144,425 | 9/1992 | Joseph | 348/419 |
| 5,146,337 | 9/1992 | Grubbs | 348/729 |
| 5,148,272 | 9/1992 | Acampora et al. | 348/397 |
| 5,208,673 | 5/1993 | Boyce | 348/701 |
| 5,212,549 | 5/1993 | Ng et al. | 348/409 |
| 5,218,449 | 6/1993 | Ko et al. | 358/330 |
| 5,225,946 | 7/1993 | Uchiumi | 360/72.1 |
| 5,282,049 | 1/1994 | Hatakenaka et al. | 358/335 |
| 5,291,343 | 3/1994 | Goto | 360/33.1 |

OTHER PUBLICATIONS

N. S. Jayant and P. Noll, Digital Coding of Waveforms, Prentice-Hall, 1984, pp. 164–170.

N. S. Jayant and L. R. Rabiner, "The Application of Dither to the Quantization of Speech Signals," Bell System Technical Hournal, pp. 1293–1304, Jul.–Aug. 1972.

"Design Considerations for the D-2 NTSC Composite DNTR", Richard Brush, pp. 182–193, SMPTE Journal, Mar. 1988.

Robert Rast, Joseph Glaab, General Instrument Corporation, "Interoperability Considerations for Digi Cipher HDTV", Oct. 1, 1992.

J. Lee, J. Seo, Y. Park, D. Youn, T. Oh, IEEE Transactions on Consumer Electronics, "A Study on New DCT-Based Bit Rate Reduction Algorithm and Variable Speed Playback for a Home–Use Digital VCR", vol. 38, No. 3, Aug. 1992, pp. 236–241.

Advanced Television Research Consortium, "Advanced Digitial Television, Prototype Hardware Description", Feb. 12, 1992.

David Sarnoff Research Center, Philips Laboratories, "Advanced Digital Television System Description", Jan. 20, 1992.

I.S.O. MPEG (Moving Pictures Expert Group), "Coding of Moving Pictures and Associated Audio for Digital Storage Media at up to about 1.5 Mbit/s, Part 2 Video", 2-11172 rev 1, Nov. 23, 1991.

Zenith, AT&T, "Technical Details, Digital Spectrum Compatible", Sep. 23, 1991.

C. Yamamitsu, A. Ide, M. Nishino, T. Juri, H. Ohtaka, IEEE Transactions on Consumer Electronics, "A Study on Trick Plays for Digital VCR", vol. 37, No. 3, Aug. 1991, pp. 261–266.

S. Inoue, H. Kaneko, H. Takao, T. Fuji, M. Ishibashi, IEEE Transactions on Consumer Electronics, "New Method for Variable Speed Playback for High Definition VCRs", vol. 37, No. 3, Aug. 1991, pp. 244–251.

General Instrument Corporation Videocipher Division, "Digicipher HDTV System Description", Document No. 62004, Aug. 22, 1991.

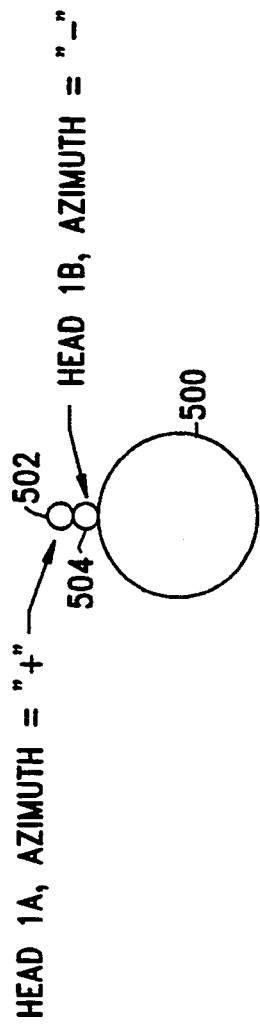
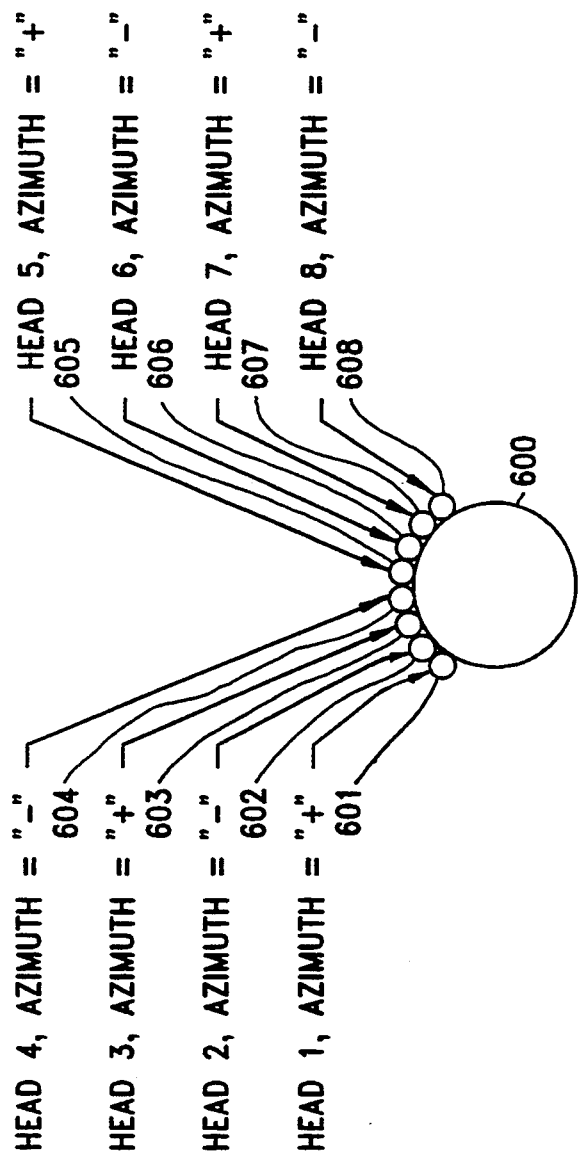

LP MODE (1/3X) RECORDING MODE EXAMPLE:

BLANK TAPE:

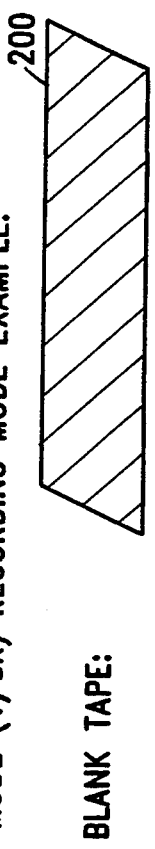

FIG. 5A

PATH OF FIRST HEAD: (RECORDED)

FIG. 5B

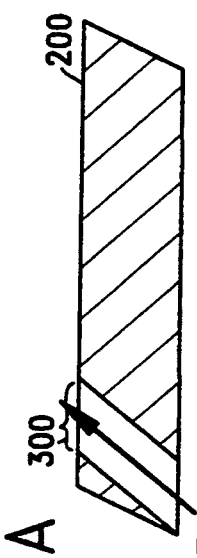

PATH OF SECOND HEAD: (NOT RECORDED)

LINEAR TAPE SPEED IS 1/3, CAUSING TRACK OVERLAP. THIS IS OK. BECAUSE NO DATA IS RECORDED ON THIS HEAD'S PASS.

FIG. 5C

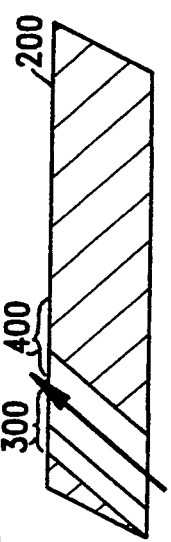

PATH OF THIRD HEAD: (NOT RECORDED)

OVERLAP AGAIN OCCURS, BUT THIS HEAD'S PASS IS ALSO NOT RECORDED

FIG. 5D

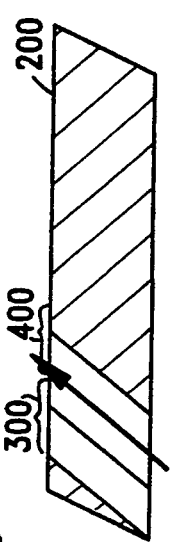

PATH OF FOURTH HEAD: (RECORDED)

NO OVERLAP, SO DATA IS RECORDED ON THIS HEAD'S PASS.

FIG. 5E

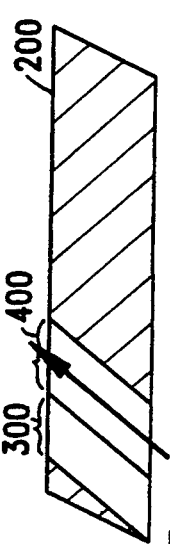

METHOD FOR RECORDING DIGITAL DATA USING A SET OF HEADS INCLUDING A PAIR OF CO-LOCATED HEADS TO RECORD DATA AT A RATE LOWER THAN THE FULL RECORDING RATE POSSIBLE USING THE SET OF HEADS

RELATED APPLICATIONS

This application is related to copending U.S. patent application Ser. No. 08/003,887, titled "DIGITAL VIDEO RECORDING DEVICE" which is hereby expressly incorporated by reference.

FIELD OF THE INVENTION

The present invention is directed to digital video tape recorders ("VTRs"), and more particularly, to a method for increasing the recording time of a digital VTR.

BACKGROUND OF THE INVENTION

Digital VTR's call be expected to receive digital video data in a compressed format. Several formats have been proposed for compressing video data to form a digital video data stream which may then be displayed and/or recorded on video tape. For a discussion of several proposed digital video standards, see U.S. patent application Ser. No. 08/003,887 referred to above.

One digital video compression and data transmission format that offers particular promise with regard to high definition television ("HDTV") is the ISO-MPEG (International Standards Organization—Moving Picture Experts Group) standard described in a report titled "Coding of Moving Pictures and Associated Audio for Digital Storage Media up to about 1.5 Mbits/s", ISO 2 11172 rev 1, June 10, 1992 hereby expressly incorporated by reference.

Terms used in this application are intended to be used in a manner that is consistent with the same terms used in the MPEG standard unless indicated otherwise. Thus, references to video pictures, I-pictures, P-pictures, B-pictures, video codewords, video codeword headers, slices, slice headers, macroblocks, macroblock headers, DCT (discrete cosine transform) coefficients and other terms used to refer to video data stream elements and compression techniques are intended to refer to such elements and techniques as defined by the MPEG standard. The use of such MPEG terminology is, however, in no way intended to limit the present application to the MPEG video data standard. Accordingly, references to MPEG data stream elements are intended to cover similar "MPEG like" data stream elements incorporated into video standards which use the same basic formats and data compression techniques described in the above referenced MPEG documents.

It is to be understood that various features of the present invention, such as data recording techniques, as opposed to, e.g., data prioritization and reduction techniques, are generally not data format dependent and are therefore not limited to applications involving specific data formats.

While digital VTRs may have to be designed to work with one or more video compression schemes and/or data formats, the basic problems associated with increasing the recording time of a digital VTR are generally the same regardless of the format of the compressed digital video data being supplied to a VTR for recording and later playback.

Herein references to normal play modes of VTR operation are intended to refer to modes of digital VTR operation wherein data sufficient to reproduce a complete or almost complete set of the video pictures received by the VTR are recorded on, and/or read from, the video tape. Normal play modes of VTR operation are to be contrasted with trick play modes of VTR operation such as fast forward and reverse operation where only a small portion of the video data received and recorded on a tape are read and displayed during such trick play operation.

Analog video tape recorders that are capable of supporting multiple normal play modes of VTR operation are well known. For example, VHS VCR's generally support long play "LP" mode, and extended play "EP" mode in addition to the standard play "SP" mode of operation. In each of the three modes of operation, the same fixed length of tape is used to store a different number of video images, e.g., a sufficient number of images to display 2, 4, or 6 hours of National Television Systems Committee ("NTSC") analog video data. Each of these three different normal play modes of operation provide differing image quality.

The different normal play modes supported by VHS VCRs are achieved by using different tape speeds for each normal play mode of VHS VCR operation resulting in different data densities on the tape for each normal play mode. This permits the video data rate and the tape output data rate to remain unchanged in the different modes of operation. While the video data rate remains the same for all modes of VHS operation, as the tape data density is increased to support the longer play modes of operation, the signal to noise ratio ("S/N") is decreased resulting in a corresponding decrease in image quality during VHS playback operation.

Digital video tape recorders, including those that might be used to record HDTV will generally be required to operate in the highest tape data density mode possible in order to store the large amounts of digital data needed to represent video images. Thus, any attempt to increase data density on a digital video tape beyond the normal data density will result in an unacceptable digital error rate. Such a high error rate is due to the decrease in the S/N ratio which results from the use of the higher than normal tape data density. In a digital VTR the increased digital error rate that results from the use of higher than normal tape data density rates, is likely to lead to a catastrophic loss of picture. Accordingly, varying the tape data density in a digital VTR does not provide a viable means of supporting multiple normal play recording and video tape recorder playback speeds, i.e., modes of digital VTR operation, as it does in analog VCRs.

The use of data reduction techniques to reduce the amount of data required to represent a series of images might appear to be the only thing necessary for increasing digital VTR recording time. However, the mere reduction, e.g., through the use of data compression or other techniques, in the data rate required to create a series of video images, in and of itself, is insufficient to achieve a long-play mode of operation in a digital VTR. Generally, because of the difficulty of manufacturing a headwheel assembly that can be used to record video data at more than one rotational speed, known digital VTR's only support the recording of a data bit stream at a single constant data density. Because HDTV and other video formats require that a fixed number of video images be displayed during a time period of a predetermined duration, a reduction in the data rate requires that less data be recorded and later read back per a given unit of time than would be required if the data were recorded and read back at the full bit stream data rate. Thus, a digital VTR which implements a long-play mode through a reduction in the data rate is required to implement one bit stream recording and playback data rate for standard play operation and another bit stream recording and playback data rate for long-play mode operation.

Known digital VTRs are capable of recording data comprising bit streams only at a single constant data rate. Accordingly, because known digital VTR's are incapable of recording multiple-speed bit streams at a constant data density, which would be required to support a standard play and a long play mode of operation in a digital VTR, known VTRs can not support a long play mode of operation implemented using data reduction techniques alone.

While some known data logging devices based on linear scan, as opposed to helical scan, recording methods support the recording of multiple-speed bit streams, such data logging devices are impractical for use as digital VTRs. This is because linear scan data recording devices capable of high data rates generally use a large number of heads which make such recording devices too costly for use as consumer digital VTRs.

Accordingly, there is a need for a digital VTR that can support at least one long play mode of operation in addition to standard play operation. In addition, in order to maintain compatibility with standard HDTV receivers during long play mode operation, the digital VTR should generate a data stream that is compliant with the video data compression standards and data stream format used during standard play mode. Furthermore, it is highly desirable that the digital VTR be capable of being implemented in a manner that makes it practical as a consumer digital VTR.

SUMMARY OF THE INVENTION

The present invention is directed to a method and apparatus for increasing the recording time of a digital VTR. The method of the present invention permits a digital VTR to support both a standard mode of normal play operation and one or more long play modes of normal play digital VTR operation.

In accordance with the present invention, the headwheel contained within the digital VTR of the present invention, upon which the recording and playback heads are mounted, rotates at a single fixed rate. This rotational rate remains the same for both standard and long play modes of VTR operation. Accordingly, the mechanical problems associated with manufacturing a headwheel assembly that is designed to operate accurately at multiple rotational speeds are avoided.

The method of the present invention for providing long play modes of digital VTR operation comprises two operations: 1) data reduction and 2) recording at a reduced data rate.

The first step involves generating a reduced rate bit stream from a full rate data stream of video data, e.g., a full rate bit stream, received by the digital VTR of the present invention. The second step involves recording the reduced rate bit stream on the tape during long play mode operation at the same data density that the full rate bit stream is recorded on the tape during standard play recording operation.

The present invention provides three data reduction methods which may be used to generate the reduced rate bit stream needed to support long play modes of digital VTR operation. The first data reduction method of the present invention uses data prioritization to prioritize the video data. Data are then selected for inclusion in the reduced rate bit stream as a function of the data's assigned priority. The second data reduction method of the present invention achieves the desired rate of data reduction by performing requantization of the data in the full rate bit stream using a higher quantization scale factor. The third data reduction method of the present invention involves the selection of data from the full rate bit stream to be included in the reduced rate bit stream as a function of what portion of a video picture the data in the full rate bit stream represent. Higher priority is given to data representing the central portion of video pictures while lower priority is given to data representing the edge portions of video pictures.

Because the data reduction methods of the present invention provide a way to generate a reduced rate bit stream that remains compliant with the data standards and format of the full rate bit stream, a standard receiver can receive and display the video images contained in the reduced rate bit stream generated in accordance with the methods of the present invention without the need to perform special data processing.

In one embodiment of the present invention the digital VTR indicates to a receiver, e.g., through the use of commands incorporated into the reduced rate bit stream generated during long play operation, when it is outputting a reduced rate bit stream. The reduced rate bit stream may be generated by, e.g., using one of the three data reduction techniques of the present invention.

In accordance with such an embodiment, when a receiver detects that it is receiving a reduced rate bit stream or is informed of that fact by receiving a signal from the digital VTR, it responds by performing, e.g., low pass filtering on the data it receives to enhance the quality of the generated images.

In yet another embodiment, when requantization is used as the method of generating the reduced data rate, dithering is used to enhance the quality of the images that are generated from the reduced rate bit stream.

By generating a reduced rate bit stream for use during long play modes of VTR operation, the present invention reduces the amount of data that must be recorded on a tape to represent the series of images, e.g., video pictures, represented by the data comprising the full rate video bit stream.

However, in the case of digital VTRs, the mere reduction in the data rate alone is not enough to achieve a long play mode of operation. To achieve such a long play mode of operation the digital VTR must also be capable of recording the reduced rate bit stream at the same tape data density as used to record the full rate bit stream recorded during standard play mode recording operation.

Accordingly, the present invention provides a plurality of methods for recording a reduced rate bit stream at the same tape data density that the full rate bit stream is recorded at during standard VTR mode recording operation.

Several different digital VTR recording and playback head arrangements may be used to implement the recording methods of the present invention. However, in order to provide a method of recording a reduced rate bit stream that is suitable for consumer VTRs, the recording methods of the present invention use the same rotational speed of the VTRs headwheel for both standard and long play modes of VTR operation. However, the linear tape speed and the periods during which heads are used to record data are different during long play mode operation than standard play mode operation. This permits a VTR, operating in accordance with one of the recording methods of the present invention, to record data at the same tape data density as used during standard play recording operation.

Thus, a digital VTR in accordance with the present invention can achieve long play modes of digital VTR operation by generating a reduced rate bit stream from the video data contained in the full rate bit stream received by the VTR and by then recording the reduced rate bit stream at the same tape data density that data are recorded at during standard mode digital VTR operation.

Furthermore, such long play modes of digital VTR operation can be achieved without the need to support VTR normal play operation using multiple headwheel rotational speeds, e.g., one speed for standard mode operation and another speed for long play mode operation. Thus, the complicated mechanical problems, associated with producing a headwheel that can be used to record video data at more than one rotational speed of headwheel operation, are avoided.

In addition to being directed to various methods of recording a reduced rate data stream on a tape, the present invention is directed to several methods of reading pre-recorded data from a tape at reduced data rates.

BRIEF DESCRIPTION OF THE DRAWINGS

FIG. 3 is a representative diagram of a VTR head assembly comprising two heads of different azimuths arranged as a set of co-located heads.

FIG. 4 is a representative diagram of a VTR head assembly comprising eight heads, four of positive azimuth and four of negative azimuth. FIGS. 5a through 5e are diagrams illustrating the path the heads of FIG. 1 trace over a tape in accordance with one long play mode embodiment of the present invention.

DETAILED DESCRIPTION

Figure 1:
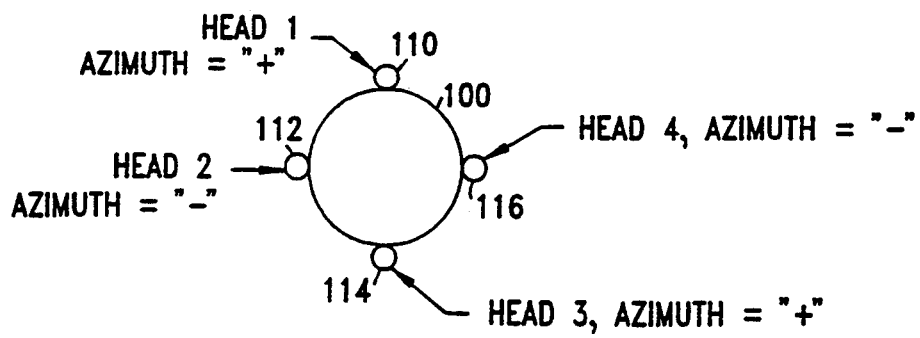
FIG. 1 is a representative diagram of a VTR head assembly comprising four heads, two heads being of positive azimuth and two heads being of negative azimuth.

The present invention is directed to digital video tape recorders ("VTRs") and, more particularly, to a method of increasing the recording time of digital VTRs by permitting a digital VTR to support multiple normal play modes of VTR operation, e.g., a standard p-lay mode of operation and one or more long play modes of VTR operation. As will be discussed below, the digital VTR of the present invention maintains the same tape data density regardless of the particular normal play mode of VTR operation and produces a data stream that is in full compliance with the data compression standards and video format of the full rate bit stream generated during standard play mode operation.

Herein long play mode will be used to generally refer to a digital VTR mode of operation wherein a fixed length of video tape is used to store data representing more video images or pictures than are stored on the same length of tape during standard play mode operation. Stated another way, during standard play mode, a fixed length of tape may store video data sufficient to produce, e.g., 2 hours of HDTV images while during long play mode the same fixed length of tape may be used to store, e.g., data representing 4 hours of HDTV images.

While the references to data in this application generally refer to video data, the data may also include audio data and/or other associated data.

The data stream received by a VTR from, e.g., a transmitter or cable television source, is normally of a fixed bit rate which is a function of the particular data transmission format. The data stream received by the VTR of the present invention and output during standard mode VTR operation, will be referred to as a full rate data stream or a bit stream. Data streams generated by the VTR of the present invention having a data rate that is less than the data rate of the full rate bit stream will be referred to as reduced rate data streams or reduced rate bit streams. During digital VTR long play mode operation such data streams may be generated, e.g., by applying data reduction techniques to the full rate bit stream received by the digital VTR.

Generally, long play mode recording in accordance with the present invention involves three steps 1) reducing the amount of data that must be recorded on a tape to represent a series of images, e.g., video pictures by generating a reduced rate bit stream from the received full rate bit stream, 2) recording the data in the reduced rate bit stream on a tape at the same data density that data are recorded at during the standard play mode of VTR operation when the full rate bit stream is recorded on the tape, and 3) reading a previously recorded tape at a reduced data rate.

Thus, in accordance with the present invention, VTR recording during long play mode is achieved by first reducing the amount of data needed to represent images or pictures to produce a reduced rate bit stream from the full rate bit stream received by the digital VTR. During long play mode recording is then performed by recording the reduced rate bit stream on a tape at the tape's normal data density in accordance with the methods of the present invention. Finally, data are read from the tape at a reduced rate in accordance with the methods of this invention. As discussed above, in the case of digital VTRs, the tape's normal data density will generally approximate the tape's maximum data density. In this manner, the present invention achieves long play modes of operation without having to increase data density as is commonly done in analog VCR applications.

The present invention provides three data reduction methods that may be used either alone or in combination to reduce the amount of data needed to represent a series of images during long play modes of VTR operation. In addition, the present invention provides various methods for recording and playing back the reduced set of digital data needed to represent a series of images on a video tape, at the same data density as used when recording video data during standard play mode of VTR operation. These recording methods permit the headwheel upon which the video heads are mounted to rotate at the same rate when recording either a full rate bit stream or a reduced rate bit stream. The data reduction methods of the present invention will now be described in detail.

Three data reduction techniques of the present invention which are discussed below, are designed to be used with the full rate compressed video bit stream that a digital VTR will normally receive. The full rate compressed video that a VTR receives will contain data representing a series of video pictures. The video pictures may be grouped into sequences. Each sequence of pictures may contain, e.g., one fully intracoded video picture and one or more inter-coded video pictures. Each inter-coded video picture may be either a predictively or bi-directionally coded video picture. The intra-coded Video picture in each sequence of pictures normally serves as an anchor frame for other inter-coded video pictures within the sequence of pictures.

It is expected that each video picture to be represented as compressed digital video data will be divided into a number of segments for encoding purposes. In accordance with such encoding schemes, the data representing each segment of a video picture correspond to a particular portion of a video display screen. For example, one segment may represent a portion of a video picture intended to be displayed near the center of a video display screen while another segment may represent a portion of a video picture intended to be displayed near the outside edge of a video display screen.

Accordingly, a video data stream, i.e., bit stream, received by a digital VTR is likely to include data representing multiple sequences of pictures wherein each sequence of pictures includes data representing a series of video pictures. The data representing each video picture may comprise data representing segments of the video picture, e.g., macroblocks, with each macroblock corresponding to a different physical screen position. Macroblocks that represent a video picture may be further grouped together for encoding purposes into, e.g., slices.

In addition to the encoded video data, the video data stream may include e.g., headers identifying the data representing each video picture, as well as headers identifying slices and macroblocks which comprise each video picture.

The video data and header information comprising a video data stream may be variable length encoded into, e.g., codewords. The codewords may be further arranged into data packets. The data packets and/or codewords may contain additional headers identifying the contents of the individual data packets or codewords contained therein. The data packets which are further arranged to form a digital video data stream may be received by a digital VTR of the present invention.

Accordingly, the digital video data stream received by a digital VTR is likely to include variable length encoded, compressed video data, arranged as a series of groups of pictures with the data comprising each group of pictures being encoded on a picture by picture basis.

As discussed above, in accordance with the present invention, the amount of data recorded on a tape must be reduced to achieve longer recording times, i.e., long play modes of VTR operation.

One method of achieving the reduced data rate needed for long play VTR operation is to fully decode the compressed video data comprising the full rate video data bit stream received by the digital VTR and then to do a full encode of the decoded video data at the desired bit rate. While this method would provide the required reduction in video data, such an approach is cost prohibitive because of the excessive amounts of hardware required to implement such a decoder and encoder in a digital VTR.

The present invention provides three alternative means of reducing the amount of video data that must be recorded to achieve digital VTR long play modes of operation. These methods of generating a reduced rate bit stream require less hardware, and are therefore generally cheaper to implement than the above method of fully decoding and re-encoding the data in the full rate bit stream.

In accordance with each of the following data reduction techniques, the data in the full rate data stream received by a digital VTR is first variable length decoded before the data reduction methods of the present invention are applied° After a reduced rate data stream is generated from the variable length decoded full rate data stream, it is re-encoded to generate a variable length encoded reduced rate bit stream.

In accordance with the first of the three data reduction techniques of the present invention, selected parts of the full bit-rate compressed video bit stream are extracted and packed to form a new reduced bit-rate bit stream that remains compliant with the encoding and bit stream data format supported by the digital VTR of the present invention.

In accordance with this method, the bit rate of a full rate bit stream can be reduced to a target bit rate by first prioritizing each codeword in the bit stream, and then selecting the codewords to form a new reduced rate bit stream having the desired data rate.

This approach takes advantage of the fact that, regardless of the particular encoding method used to generate the full rate bit stream, some codewords in the bit stream will contain data that are of relatively little importance. Such codewords may be omitted from the bit stream without having a significant impact on picture quality. On the other hand, other codewords will contain relatively important data without which it might not be possible to generate a recognizable image.

In accordance with this codeword prioritization approach, each codeword in the full rate data bit stream received by the VTR is assigned a priority level or number based on its relative importance to generating a video frame having good image quality. Accordingly, codewords are prioritized as a function of their importance in generating video frames during long play modes of VTR playback operation.

The prioritization scheme used to support long play modes of VTR operation are likely to be similar to those used for trick play prioritization described in U.S. patent application Ser. No. 08/003,887, titled "DIGITAL VIDEO RECORDING DEVICE" Accordingly, a digital VTR that contains hardware for trick play prioritization such as the one in the above identified copending patent application, could implement a long play prioritization scheme according to the present invention at little or no additional cost.

One suitable prioritization scheme for prioritizing video codewords for use in a reduced rate bit stream suitable for supporting long play mode digital VTR operation is described below with regard to an MPEG based data stream. Listed below are the types of data that may be contained in a codeword, and the suggested priority number to be assigned to the codeword containing the data. It should be noted that the data in each codeword correspond to, or is associated with, a particular video frame represented by the data in the video data stream.

One suitable prioritization order for long play mode VTR operation, listed in order from the most important to the least important data, is as follows:

1. Video codeword headers that contain sequence and picture information, and slice headers that contain information on which position of the screen the corresponding slice data represents.
2. Macroblock headers which contain information about either a macroblock's position within a slice, quantization information and/or the method used to code macroblocks corresponding to the macroblock headers.
3. DC coefficients of Intra-coded video pictures (I-pictures).
4. Motion vectors for predictively coded video pictures (P-pictures).
5. DC coefficients of the discrete cosine transform ("DCT") for P-pictures which correct the corresponding P-picture and improve the P-picture's image quality.
6. Motion vectors for bi-directionally coded video pictures (B-pictures), that provide enough information to predict a picture from the last I-picture or P-picture.
7. DC coefficients of the DCT for B-pictures which correct the corresponding B-pictures thereby improving the quality of the image generated therefrom.
8. Higher order DCT coefficients for I-pictures that can be used to improve the quality of the corresponding I-pictures and the P- and B-pictures which use the I-pictures as anchor frames.
9. Higher order DCT coefficients for P-pictures that can be used to further improve the quality of the corresponding P-pictures.
10. Higher order DCT coefficients for B-pictures that can be use to improve the quality of the corresponding B-pictures.

While the goal of the above prioritization scheme is to provide a method by which the data rate can be reduced, it is important to note that the reduced rate data stream generated during VTR long play mode operation should include sufficient data to support the same frame display rate supported during standard play mode.

Accordingly, unlike the case of selecting data to be displayed during trick play operation, the data reduction technique of the present invention is designed to reduce the amount of data needed to generate video pictures without decreasing the number of video pictures to be displayed. Thus, the data reduction methods of the present invention provide a method of reducing the data rate without altering the frame display rate.

Thus, while the above prioritization scheme is similar to that suggested for trick play prioritization, the reduced rate data stream generated for long play mode operation should include B-picture data that are of little or no use during trick play operation. Such B-pictures are normally not displayed during trick play operation and the data needed to generate such B-pictures are therefore normally omitted from a trick play data stream.

In order to achieve the desired reduction in the data rate, after prioritizing the codewords, the codewords having the highest priority from each sequence of pictures or video picture, are selected to provide a reduced data rate bit stream having the desired data rate, e.g., for long play mode operation. For example, if a 25% reduction in the full bit stream data rate was desired for long play mode operation to provide a corresponding 25 % increase in recording time, the highest priority codewords from each group of pictures or video pictures could be selected from the prioritized full rate data stream to create a reduced rate bit stream having a data rate of 75% that of the data rate of the full rate bit stream.

Such a data reduction approach can be used to achieve virtually any desired reduction in the data rate assuming sufficient data remains in the reduced rate bit stream to generate recognizable video images during long play mode VTR operation.

In accordance with one embodiment of the present invention, the data rate reduction needed to support long play modes of digital VTR operation is achieved merely by reducing the amount of higher order I-, P- and B- DCT coefficient data required to achieve the desired amount of data reduction. Higher order I-, P- and B- DCT coefficients include DCT coefficients other than the DC (zero frequency) coefficients.

In such an embodiment, it is desirable to maintain the same relative amounts of higher order I-, P- and B- DCT coefficients in the reduced rate bit stream as found in the full rate bit stream. Accordingly, the relative amounts of data represented by the codewords which are assigned to priority levels 8, 9 and 10, in accordance with the prioritization scheme of the present invention, should be selected for inclusion in the reduced rate bit stream in approximately the same ratios found in the full rate bit stream received by the digital VTR.

By maintaining the same relative amounts of higher order I-, P- and B- DCT coefficients in the reduced rate bit stream, as found in the full rate bit stream, dramatic changes in image quality between successive I-, P- and B-pictures will be avoided. In this manner, a viewer watching a series of images generated from a reduced rate data stream will not be confronted with sudden noticeable changes in image quality as the various I-, P- and B- video pictures are displayed.

While the above prioritization scheme is described using MPEG terminology, it should be noted that the prioritization scheme can be readily generalized to numerous other digital video compression systems.

The second data reduction method of the present invention, relies on changing the quantization scale factor used to generate the full rate bit stream to generate a reduced rate bit stream.

Normally when a bit stream is encoded, the quantization scale factor is dynamically adjusted to maintain the average data rate at the broadcast bit rate. The use of higher quantization scale factors results in the exclusion of higher frequency DCT coefficients from the data stream. The exclusion of such high frequency DCT coefficients has the result of reducing the quality of the images that can be reproduced from the data contained in the video data stream. However, a higher quantization scale factor does offer the advantage of reducing the amount of data that is included in the video data stream.

In accordance with the second data reduction method of the present invention, the data rate is reduced by increasing the quantization scale factor from that used during encoding of the broadcast bit stream received by the VTR.

In order to change the quantization scale factor to achieve the desired reduction in the data rate from the data rate of the full rate bit stream, the full rate bit stream is first variable length decoded. The decoded bit stream is then parsed to identify the DCT coefficients contained within the received portion of the data stream. The identified DCT coefficients are then requantized using a higher scale factor than that used to generate the full rate bit stream. The decoded and requantized bit stream is then variable length encoded again to form a reduced rate bit stream that is compliant with the format of the full rate bit stream.

It should be noted that in accordance with this method, the relative increase in the quantization scale factor need not be fixed at the same value for all DCT coefficients, macroblocks or pictures.

Figure 6A:
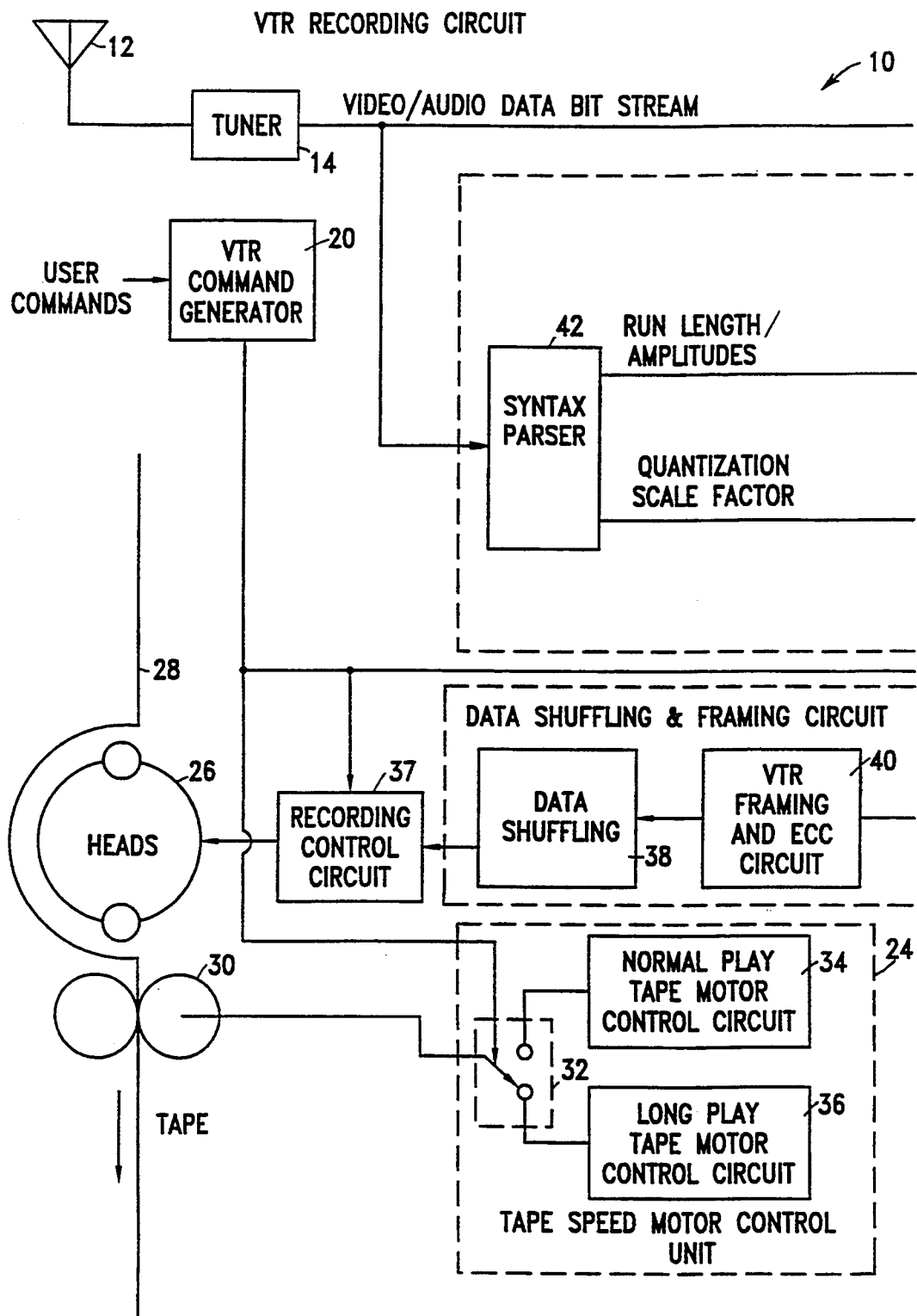
FIG. 6, which comprises the combination of FIGS. 6A and B, is an exemplary schematic block diagram of a VTR recording circuit of the present invention.
Figure 6B:
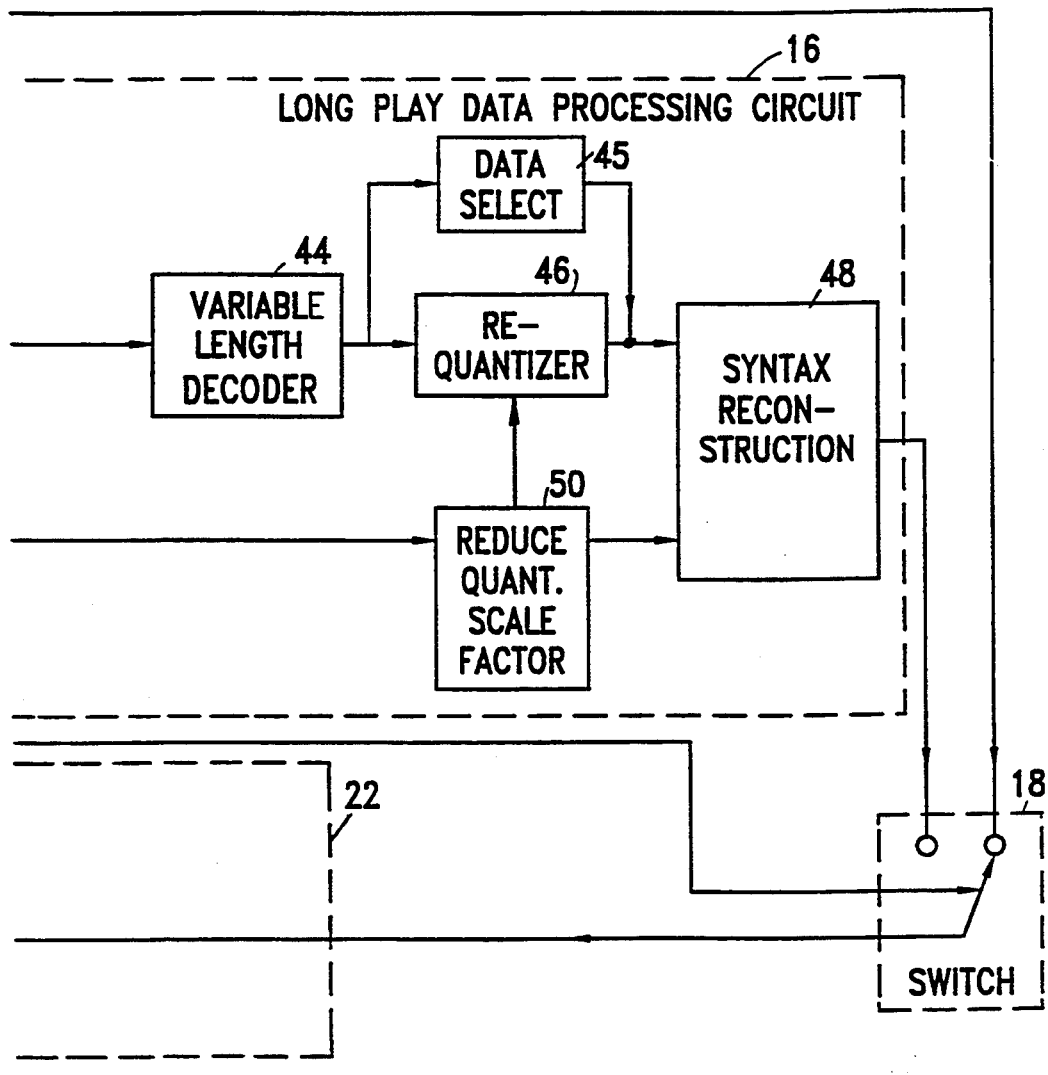

As will be discussed below, the VTR recorder circuitry illustrated in FIG. 6 is capable of performing such a requantization process in accordance with the data reduction method of the present invention.

Simulations have shown that requantizing with a higher quantization factor gives better results than data reduction through the use of data prioritization, when the two methods are used to achieve the same total data rate reduction. However, data prioritization is a simpler operation to implement than requantization. Accordingly, it may be cheaper to implement a long play mode in a digital VTR using data prioritization and selection rather than requantization to achieve the desired reduction in the data rate. However, the use of requantization provides superior results in terms of image quality.

The third method of generating a reduced rate bit stream from a full rate bit stream received by a VTR will now be described.

In the previously described methods, the bit rate was reduced by either 1) performing variable length decoding, data prioritization, selection of the prioritized data and re-encoding of the selected data or 2) performing variable length decoding, re-quantizing of the decoded data with an adjusted quantization scale factor selected to produce a reduced bit rate, and re-encoding of the re-quantized data.

In accordance with each of these methods data reduction is performed uniformly over each video picture. Accordingly, data reduction is performed without taking into consideration the screen location of the image portion to be produced by the data upon which data reduction is being performed.

As discussed above, data within the bit stream received by the VTR represents a series of video pictures with portions of each video picture being represented by data contained within the bit stream. Each portion of a video picture corresponds to a particular screen location, for example, the center of the screen or the lower outside right hand portion of the screen. In the case of MPEG based broadcast systems each video picture is divided into many macroblocks which are individually encoded. Thus, each macroblock in the bit stream corresponds to a particular picture and a particular position within that picture.

In accordance with the third data reduction technique of the present invention, screen location of the image to be generated from each piece of data in the bit stream is used as a factor when prioritizing data. In accordance with this method, data associated with the center of video pictures is assigned a relatively higher data rate than the data representing video picture edges.

Thus, because of this type of prioritization, when data are selected to form the reduced rate bit stream, a relatively high amount of data corresponding to the center of video pictures will be selected while a relatively lesser amount of the data corresponding to the edges of video pictures will be selected for inclusion in the reduced rate bit stream. In this manner, data representing the center portion of video pictures may be included in the reduced bit rate stream at the same or at a slightly reduced bit rate when compared to the full bit rate stream. However, data representing the edges of video pictures will be included in the reduced rate bit stream at a bit rate that is significantly lower than the bit rate of such data in the full bit rate data stream.

This third data reduction technique results in images that are relatively clear in the center portions of each picture but are of decreasing quality towards the edge regions of each picture.

Various test have demonstrated that the human visual system is more sensitive to some areas of a video image than others. By concentrating higher resolution images towards the center of a display screen with decreasing image quality towards the edges, the third method of the present invention takes advantage of this aspect of human image perception. By providing a method by which the available video data are used to provide video frames that are of higher quality towards their center, i.e., the portion of the image to which a person is most likely to be sensitive, the present invention provides a more efficient use of the available video data than would result by producing an image having the same quality over the entire frame.

Furthermore, such a selective decrease in image quality towards the edges of each video frame mirrors that generally obtainable from consumer televisions incorporating picture tubes. Such picture tubes are generally sharper at the center than at the edges of the tube. In accordance with the third data reduction method of the present invention, the increasing degree of data reduction that is performed on video frames, from the center of the frame outward, should result in a slow and gradual change in sharpness and brightness similar to that inherently associated with picture tube used in consumer televisions.

Accordingly, this third data reduction technique offers a method of providing longer play modes of operation with the reduction in image resolution from long play mode operation corresponding to the same type of image quality reduction that results from the inherent limitations associated with the use of a picture tube. Because consumers are already accustomed to such image quality limitations this data reduction method offers advantages over other data reduction methods that may result in image quality problems which are more noticeable to a consumer.

Data reduction methods 1 and 3 can be combined such that data prioritization and selection can be used as the method of reducing the data rate to produce a reduced rate bit stream from a full rate bit stream.

In accordance with yet another embodiment of the present invention, data reduction methods 2 and 3 are combined to provide acceptable data reduction results for long play digital VTR operation have been achieved by increasing the quantization scale factor as a function of the screen position of the image represented by the video data. In such an embodiment the quantization scale factor is increased to a greater degree for data representing portions of images located toward the edge of the screen as opposed to the center of the screen. A total data reduction of 20– 40% with satisfactory results was shown using simulations to be possible using the combination of data reduction methods 2 and 3 as the method of data reduction.

Significantly, the above described data rate reduction methods all produce reduced rate bit streams that remain compliant with the data stream format of the full rate bit stream. Accordingly, a receiver that receives a reduced rate bit stream produced by a digital VTR during long play mode operation need not know that it is receiving a reduced rate bit stream to be able to decode and display the images represented by the data in the bit stream.

Regardless of the data rate reduction method used to achieve the data reduction required to support long play mode VTR operation, when the data rate is greatly reduced, e.g., by more than 40%, images that are produced from the reduced rate data stream suffer not only from having a lower resolution but also from compression artifacts. Accordingly, images produced from greatly reduced data streams suffer from blocking effects and noise patterns that occur as a result of the compression artifacts.

Compression artifacts result in patterned or colored noise. Such patterned noise is much more noticeable and objectionable to a viewer than low resolution images or white noise which is without pattern.

As will be described below, if a receiver is aware that it is receiving a reduced rate bit stream from a digital VTR operating in long play mode, it may perform special video data processing to enhance the quality of the images generated from the reduced rate bit stream received from the digital VTR.

In one embodiment, a digital VTR implemented in accordance with the present invention generates one or more signals or commands which are incorporated into the reduced rate bit stream generated during long play mode VTR operation. These signals or commands serve to indicate to a receiver that it is receiving a reduced rate bit stream. The commands generated by the VTR of the present invention may also instruct the receiver to perform specific video data processing operation on the video data, in the reduced rate bit stream, to enhance the quality of the resulting images or frames generated therefrom.

In accordance with the present invention, when a receiver detects that it is receiving a reduced rate bit stream generated by a VTR operating in long play mode, or receives a command or signal indicating VTR long play mode operation, the receiver performs image enhancement data processing operations intended to compensate for the omission of data normally found in the full rate data stream but intentionally omitted from the reduced data rate stream because of data constraints. Thus, once the receiver becomes aware that it is receiving data from a VTR operating in long play mode, the receiver performs video data processing operations to improve the quality, as it will be perceived by a viewer, of the video frames generated from the reduced rate bit stream.

In accordance with one embodiment of the present invention, to reduce both blocking effect and patterned noise in images generated from data received from a digital VTR operating in long play mode, the receiver performs low pass filtering on the video data representing individual video frames before generating images therefrom.

The amount of low pass filtering performed to generate such data representing any particular portion of an image is determined as a function of the amount of data reduction that was performed by the VTR on the data. Accordingly, the data representing image portions that were subject to higher amounts of data reduction will receive more lowpass filtering than image portions upon which little or no data reduction was performed.

Another approach is to control the amount of lowpass filtering performed on the data representing any particular portion of an image as a function of what position within a video frame the image data represent. For example, if the receiver detects that video data represent an edge region of a video frame where high data reduction is normally performed, a relatively high amount of low pass filtering may be performed. On the other hand, very little low pass filtering may be performed on data representing the center portion of video frames where, in one embodiment of the present invention, relatively little data reduction is performed on video data representing this portion of a video frame.

Another method of improving subjective picture quality of images generated from the reduced rate bit stream produced during digital VTR long play mode operation, is to use dithering. Dithering refers to the addition of a small amount of uniformly distributed pseudo random noise into the video data representing portions, e.g., pixels or macroblocks, of each video frame before quantization. At display time, the same pseudo random sequence is subtracted from the output of a quantizer contained in a display device such as a receiver. While dithering will introduce some noise into the displayed video frames it has the effect of whitening the noise thereby reducing the noticeability of noise patterns resulting from data reduction.

Dithering may be used in conjunction with the second data reduction method described above wherein requantization is used to generate the reduced rate bit stream. In accordance with such an embodiment, the DCT coefficients of the full rate bit stream are first inverse quantized. Then, a pseudo random dither pattern is added to them. Next, requantization with a higher quantization scale factor is performed, and the resulting video data are variable length encoded into e.g., codewords, to form the reduced rate bit stream.

During playback operation, a decoder within the receiver reverses this operation. The decoder first performs inverse quantization on the received reduced rate bit stream. Next the decoder subtracts the pseudo random dither pattern from the DCT coefficients produced by performing the inverse quantization step. This video data are then used during long play mode playback operation to produce images which will have less objectionable noise patterns as compared to those that would have resulted without the use of dithering.

The above data rate reduction methods provide several methods that can be used either alone or in combination to generate a reduced rate bit stream suitable for use during long play modes of digital VTR operation. In addition, the above image enhancement techniques provide methods for improving the quality of the images generated from such a reduced rate bit stream. However, this alone is not enough to support long play mode VTR operation.

Operating a VTR at the lower data rate made possible by the above data reduction techniques is only useful in achieving long play mode operation if the linear data density of the tape remains the same as that achieved when operating at the data rate of the full rate bit stream that is recorded during standard mode VTR operation. In other words, in order to implement a long play mode of VTR operation, a digital VTR must be able to record the reduced rate bit stream at the same tape data density as the full rate bit stream is normally recorded on the tape. For example, a digital VTR may be capable of recording 10 MB/s for 3 hours on a fixed length of tape during standard play recording operation, i.e. when recording a full rate bit stream. If, using one of the above data reduction techniques this data rate is reduced to 5MB/s, the VTR must be capable of recording the same amount of data on the fixed length of tape if recording time is to be doubled to achieve six hours of recording time, during long play operation.

Set forth below are five recording methods, in accordance with the present invention, for achieving the same tape data density during long play operation as is achieved during normal play operation. Each of the methods achieves this result while operating the VTR headwheel to rotate at the same rate it rotates during standard play operation and by moving the tape at a reduced rate.

The first method of supporting a reduced data rate while maintaining the same data density as used during standard play operation will now be described with reference to FIG. 1.

Referring now to FIG. 1, there is illustrated a head cylinder also referred to as a headwheel 100 with four heads 110, 112, 114, 116 distributed uniformly on the headwheel 100. The heads are of alternating azimuth, with heads 110 and 114 being of a positive azimuth and heads 112, 116 being of a negative azimuth. The headwheel 100 and the heads 110, 112, 114, 116 may be used in a digital VTR in accordance with the present invention as will now be described.

During standard play recording operation, the data from the full rate bit stream are recorded using all four heads 110, 112, 114, 116. Since the heads 110, 112, 114, 116 are of alternating azimuth, the requirement that adjacent tracks be of alternate azimuth for recording on a tape is satisfied.

Using such a headwheel and head arrangement, wherein there are H heads of alternating azimuth evenly distributed around a headwheel, and wherein H is a positive even integer, there are many different reduced data rates that are possible while maintaining the same data density on the tape and speed of headwheel rotation.

Generally, when a digital VTR has any even number of heads of alternating azimuths uniformly distributed around a headwheel such as the headwheel 100, reduced data rates of 1/n are possible, where n is any odd positive integer. Recording at a data rate of 1/n is achieved by performing the steps of:

1. Rotating the headwheel at the normal rate of rotation.
2. Running the tape at a linear speed of $1/n^{th}$ the normal tape speed.
3. Recording data the first time one of the H heads passes over the tape.
4. Waiting the next (n−1) times one of the H heads passes over the tape before recording data again.
5. Recording data the next time one of the H heads passes over the tape.
6. Repeating steps 4 and 5.

Because in this embodiment the heads are of alternate azimuths, and data are not written for an even number of head passes over the tape, at a data rate of $1/n^{th}$ the full bit stream data rate the tracks that are written will be of alternating azimuths as required.

A specific example of this first method of recording data at a reduced rate will now be described with reference to FIG. 1 and FIG. 5a–5e. For purposes of this example, assume that the headwheel 100 with 4 heads of alternating azimuth uniformly distributed around the headwheel 100 is being used to implement long play operation using a reduced bit stream data rate $\frac{1}{3}$ the full data rate. In accordance with the above recording method, H=4 and n=3 for the following example. The recording steps that are to be performed in accordance with the above method are as follows:

1. Rotating the headwheel 100 at the normal rate of rotation.
2. Running the tape at a linear speed of $\frac{1}{3}^{rd}$ the normal tape speed.
3. Recording data the first time one of the heads (e.g., when head one 110) passes over the tape.
4. Waiting until the next two heads (e.g., heads two and three 112, 114) pass over the tape before recording data again.
5. Recording data the third time a head (e.g., head four 116) passes over the tape.
6. Waiting until the next two heads (e.g., heads one and two 110, 112) pass over the tape.
7. Continue alternating between the recording and waiting steps.

Referring now to FIGS. 5a–5b, there is illustrated a representation of a tape 200 and the areas of the tape that will be passed over by each of the four heads 110, 112, 114, as the headwheel 100 rotates and the tape move around the headwheel at $\frac{1}{3}$ its normal linear speed.

As illustrated in FIG. 5a the tape 200 initially starts out in steps 1 and 2 of the above example completely blank. Next, in step 3, referring now to FIG. 5b, head one 110 passes over, and records data in, the segment of the tape indicated by reference numeral 300. Because the tape is moving at only one third its standard play linear rate, head two 112 will pass over two thirds of segment 300 as illustrated in FIG. 5c and over one third of the next blank tape segment 400. Similarly, because of the reduced tape speed head three 114 will pass over one third of the tape segment 300 and two thirds of the blank tape segment 400 as illustrated in FIG. 5d.

In order to prevent recording over the data already recorded in tape segment 300 no data are recorded, in accordance with step 4, when head two and three 112, 114 pass over the tape 200. However, as head four 116 passes over the blank tape segment 400, as illustrated in FIG. 5e data are recorded in accordance with step 5.

The above process of waiting until a head passes over a complete blank tape segment will then be repeated. This insures that data are recorded over the full length of the tape at the reduced data rate while maintaining the same tape data density and headwheel rotation speed as used during standard play operation. Accordingly, in this example, by using a linear tape speed that is one third the standard linear tape speed and by recording the data in the above described manner, it is possible to record a reduced rate bit stream having a data rate one third the full rate bit stream data rate, at the same tape data density as used during standard play operation. Furthermore, this can be achieved using the same headwheel rotation speed as used during standard mode recording operation.

Generally, the first recording method is a method of operating a digital video tape recorder to record on a tape a reduced rate bit stream having a data rate of $1/n^{th}$ the data rate of a full rate bit stream, where n is an odd positive integer.

The first recording method can be used with a digital VTR including a headwheel having an H number of heads of alternating azimuths uniformly distributed around the headwheel, where H is an even positive integer and n is a positive odd integer. During standard play operation such a video tape recorder rotates the headwheel at a pre-selected rotation rate and moves the tape at a pre-selected normal play tape speed when recording a full rate bit stream. The first method of the present invention for recording a reduced rate bit stream can be described, for use with such a VTR embodiment, as comprising the steps of:

a) positioning the tape in close proximity to the headwheel;

b) moving the tape around the headwheel at a speed of $1/n^{th}$ the pre-selected normal play tape speed;

c) rotating the headwheel at the pre-selected rotation rate, one of the H heads beginning a pass over the moving tape during each (360/H) degree rotation of the headwheel, each of the H heads passing over the moving tape on a diagonal relative to the length of the tape once during each complete 360 degree revolution of the headwheel;

d) passing a first one of the H heads over the tape for a first time by continuing to rotate the headwheel at the pre-selected rotation rate;

e) controlling the first one of the H heads to commence recording data from the reduced rate bit stream on the tape as the first one of the H heads begins to pass over the tape and to continue recording the data on the tape until the first one of the H heads completes passing over the tape for the first time;

f) continuing to rotate the headwheel at the pre-selected rotation rate to rotate the headwheel 360(n−1)/H degrees from the point recording was last commenced;

g) controlling the H heads to inhibit recording of data by any of the H heads that begin to pass over the tape as the tape rotates the approximately 360(n−1)/H degrees from the point recording was last commenced;

h) continuing to rotate the headwheel 360n/H degrees from the location of the head last used to record data on the tape, at the pre-selected rotation rate to pass a next one of the H heads, over the tape;

i) controlling the next one of the H heads to commence recording data from the reduced rate bit stream on the tape using the next one of the H heads when the next one of the H heads begins to pass over the tape and to continue recording the data on the tape until the next one of the H heads completes the pass over the tape;

j) repeating steps f through i.

The second method of recording data on a tape during long play digital VTR recording operation will now be described with reference to FIG. 2. The second method may be viewed as an enhancement to the first method of recording data.

This method requires the use of a headwheel having heads located at H uniformly distributed locations on the headwheel, where H is an even number equal to or greater than two. Each one of the H locations contains at least one head of alternating azimuth relative to the adjacent head locations on the headwheel. Accordingly, in this respect, the second recording method of the present invention uses a headwheel arrangement that is similar to that used in accordance with the first recording method. Thus, as described in regard to the first recording method, this head arrangement can be used to support recording data at a reduced data rate of 1/n where n is any odd positive integer.

However, to support recording at reduced data rates of 2/xH, where x is any positive integer, in addition to reduced data rates of 1/n, a pair of co-located heads, comprising heads of opposite azimuth, is located in at least one of the H head locations. Each head in a pair of co-located heads travels over the same path as the other head in the pair of co-located heads at almost exactly the same time.

Figure 2:
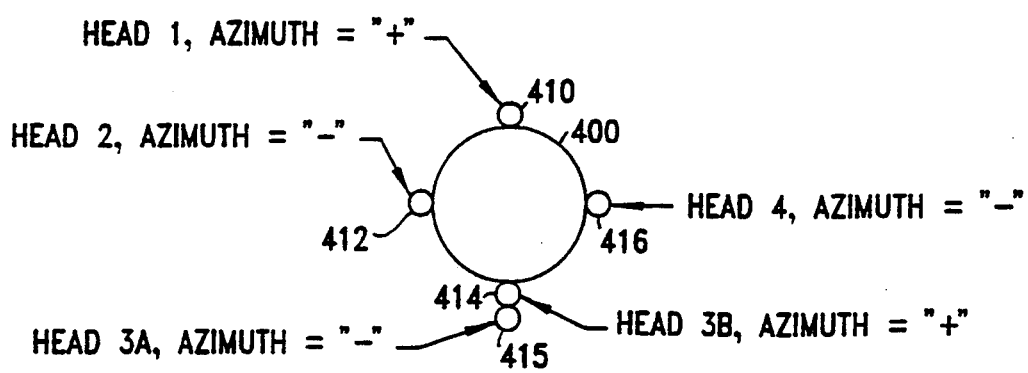
FIG. 2 is a representative diagram of a VTR head assembly comprising five heads, including one set of co-located heads.

A headwheel and head arrangement suitable for use in accordance with this second method of recording a reduced rate bit stream is illustrated in FIG. 2. As illustrated in FIG. 2, a headwheel 400 may have, e.g., four evenly distributed head locations each containing at least one head 410, 412, 414, 416. Furthermore, one of the head locations contains a second head 415 which results in a pair of co-located heads of opposite azimuth being located in one of the four head locations.

Recording at a data rate of 2/xH times the data rate of the full rate bit stream is achieved by performing the following steps of:

1. Rotating the headwheel at the normal rate of rotation.
2. Running the tape at a linear speed of 2/xH the normal linear tape speed, where x is a positive integer, and H is the number of heads.
3. Recording data when the headwheel is at the position of at least one pair of co-located heads, using a head having an azimuth that is opposite that of the head located 180 degrees from the at least one pair of co-located heads when there is a single head located opposite the at least one pair of co-located heads or using a head of the at least one pair of co-located heads having an arbitrary azimuth if there is a pair of co-located heads located opposite the at least one pair of co-located heads.
4. Waiting until (xH/2)−1 head locations have passed over the tape.
5. Recording data using a head at the next head location to pass over the tape. If this head position is populated with a non-colocated head, the azimuth will be correct; if it is populated with a co-located head, use the azimuth that is opposite the previously recorded azimuth.
6. Repeating steps 4 through 5.

Using this method and a headwheel arrangement with four head positions, one of which contains a pair of co-located heads, as illustrated in FIG. 2, recording at a reduced data rate of ½ the normal data rate can be achieved. Recording at ½ the normal data rate in such a system as the one illustrated in FIG. 2, where H equals four, is achieved by performing the following steps:

1. Rotating the headwheel 400 at the normal rate of rotation.

2. Running the tape at a linear speed of ½ the normal tape speed.
3. Recording data using the head 3A 415 in the pair of co-located heads, which is of negative azimuth, when the pair of co-located heads 414, 415 pass over the tape.
4. Recording data when head one 410, which is of positive azimuth and is located on the headwheel directly opposite the pair of co-located heads, passes over the tape.
5. Repeating steps 3 and 4.

Generally, the second recording method is a method of operating a digital video tape recorder to record on a tape a reduced rate bit stream having a data rate of 2/xH the data rate of a full rate bit stream, where x is a positive integer and H is an even positive integer.

The second recording method can be used with a digital video tape recorder which has: a headwheel having heads of alternating azimuths uniformly distributed around the outer edge of the headwheel, at least one head centered at each one of the H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth. During standard mode VTR recording operation such a video tape recorder rotates the headwheel at a pre-selected rotation rate and moves the tape at a preselected normal play tape speed when recording the full rate bit stream. Applying the second recording method of the present invention to such a digital VTR the second method of recording the reduced rate bit stream may be described as comprising the steps of:

a) positioning the tape in close proximity to the headwheel;
b) moving the tape around the headwheel at a speed of 2/xH the preselected normal play tape speed;
c) rotating the headwheel at the preselected rotation rate, one of the head locations beginning a pass over the moving tape during each (360/H) degree rotation of the headwheel, each of the H head locations passing over the moving tape on a diagonal relative to the length of the tape once during each complete 360 degree revolution of the headwheel;
d) passing the at least one pair of co-located heads over the tape for a first time by continuing to rotate the headwheel at the preselected rotation rate;
e) controlling the first head of a first azimuth of the at least one pair of co-located heads to commence recording data from the reduced rate bit stream on the tape as the first head begins to pass over the tape and to continue recording the data on the tape until the first head completes passing over the tape;
f) continuing to rotate the headwheel at the preselected rotation rate to rotate the headwheel (360/H)(xH/2−1) degrees from the point recording was last commenced;
g) controlling the record heads to inhibit recording of data by any of the record heads that begin to pass over the tape as the tape rotates the (360/H)(xH/2−1) degrees from the point recording was last commenced;
h) continuing to rotate the headwheel at the preselected rotation rate to begin passing a next one of the head locations, located on the headwheel (360x/2) degrees from the one of the recording locations where the head last used to record data on the tape is located;
i) controlling a next one of the heads located at the next one of the record head locations and having an azimuth differing from the azimuth of the last head used to record data on the tape, to commence recording data from the reduced rate bit stream on the tape using the next one of the heads when the next one of the heads begins to pass over the tape and to continue recording the data on the tape until the next one of the heads completes the pass over the tape;
j) repeating steps f through i.

A third method for recording a reduced rate bit stream at the same tape data density that a full rate bit stream is recorded will now be described. This third method is suitable for use with VTRs where there are heads at only a single position of the VTR's headwheel 500, and this position is populated with a pair of co-located heads 502, 504 as illustrated in FIG. 3.

Before describing the third reduced data rate recording method of the present invention, a method of recording a full rate bit stream on a tape using a single pair of co-located heads will be described with reference to FIG. 3. As illustrated in FIG. 3, a single pair of co-located heads 502, 504 are mounted on the headwheel 500. The first head 502, referred to hereafter as head 1A 502, is of positive azimuth, while the second head in the head pair 504, referred to hereafter as head 1B 504, is of negative azimuth.

Recording of a full rate bit stream using a single pair of co-located heads is performed as follows:
1. Rotating the headwheel 500 at the normal rate of rotation.
2. Running the tape at a linear speed of one times normal tape speed.
3. Recording data on the tape using head 1A 502 when the pair of co-located heads 502, 504 pass over the tape.
4. Recording data on the tape using head 1B 504 the next time the pair of co-located heads 502, 504 pass over the tape.
5. Repeating steps 3 and 4.

In accordance with the above method of recording a full rate bit stream on a tape using a single pair of co-located heads, tracks of alternating azimuths will be recorded on the tape by alternating between recording using the head of a positive azimuth and the head of a negative azimuth.

Playback of a full rate bitstream using a headwheel assembly comprising a single pair of co-located heads, as illustrated in FIG. 3, will now be described with reference to FIG. 3. Playback of a full rate data stream using a single pair of co-located heads may be performed as follows:
1. Rotating the headwheel, e.g., the headwheel 500, at the normal rate of rotation.
2. Running the tape at the normal linear tape speed.
3. Aligning the location of the single pair of co-located heads on the headwheel with a track of positive azimuth recorded on the tape.
4. Reading data from the tape for inclusion in the full rate data stream using head 1A, 502, when the single pair of co-located heads 502, 504 pass over the tape.

5. Reading data from the tape for inclusion in the full rate data stream using head 1B 504, when the single pair of co-located heads 502, 504 next pass over the tape.
6. Repeating seeps 4 and 5.

Recording a reduced rate bit stream having a data rate of $1/x^{th}$ the data rate of the full rate bit stream, where x is a positive integer, is possible by using the third recording method of the present invention. In accordance with the third recording method of the present invention a recording rate of $1/x^{th}$ the full rate is achieved using a headwheel with a single pair of co-located heads by performing the following steps:

1. Rotating the headwheel at the normal rate of rotation.
2. Running the tape at a linear speed of $1/x^{th}$ the normal tape speed, wherein x is a positive integer.
3. Recording data on the tape using a first head in the pair of co-located heads located on the headwheel when the pair of co-located heads pass over the tape for the first time.
4. Rotating the headwheel (x−1) rotations without recording additional data on the tape.
5. Recording data using the second head in the pair of co-located heads mounted on the headwheel, the next time the pair of co-located heads is positioned over the tape.
6. Rotating the headwheel (x−1) rotations without recording additional data on the tape.
7. Repeating steps 3 through 6.

For example, applying this method using the headwheel arrangement illustrated in FIG. 3, to record data at a data rate of ½ the data rate of a full rate bit stream, the following steps would be performed:

1. Rotating the headwheel 500 at the normal rate of rotation.
2. Running the tape at a linear speed of ½ the normal tape speed.
3. Recording data on the tape, using head 1A 502 in the pair of co-located heads located on headwheel 500, when the pair of co-located heads 502, 504 pass over the tape for the first time.
4. Rotating the headwheel 500, one full rotation without recording additional data on the tape.
5. Recording data on the tape, using head 1B 504 in the pair of co-located heads 502, 504 mounted on the headwheel 500, the next time the pair of co-located heads 502, 504 is positioned over the tape.
6. Rotating the headwheel 500, one full rotation without recording additional data on the tape.
7. Repeating steps 3 though 6.

Generally, the third recording method is a method of operating a digital video tape recorder to record, on a tape, a reduced rate bit stream having a data rate of $1/x^{th}$ the data rate of the full rate bit stream, where x is a positive integer.

Recording method three can be used with a digital video tape recorder that has a headwheel having a single pair of co-located heads mounted on the outer edge of the headwheel, the single pair of co-located heads including a first head of a first azimuth and a second head of a second azimuth.

During standard VTR recording mode operation such a digital VTR rotates the headwheel at a preselected rotation rate and moves the tape at a preselected normal play tape speed when recording a full rate bit stream. When applying the third method of the present invention to such a digital VTR, the third method of recording the reduced rate bit stream may be described as comprising the steps of:

a) positioning the tape in close proximity to the headwheel;
b) moving the tape around the headwheel at a speed of $1/x^{th}$ the preselected normal play tape speed;
c) rotating the headwheel at the preselected rotation rate, the single pair of co-located heads passing over the moving tape on a diagonal relative to the length of the tape once during each complete 360 degree revolution of the headwheel;
d) passing the single pair of co-located heads over the tape by continuing to rotate the headwheel at the preselected rotation rate;
e) controlling the second head to inhibit the second head from recording data while the single pair of co-located heads passes over the tape;
f) controlling the first head to record data from the reduced rate bit stream on the tape as the single pair of co-located heads pass over the tape;
g) passing the single pair of co-located heads over the tape (x−1) times without recording data by continuing to rotate the headwheel at the preselected rotation rate;
h) passing the single pair of co-located heads over the tape for an $x^{th}$ time after the last pass over the tape during which data was recorded;
i) controlling the first head to inhibit the first head from recording data from the reduced rate bit stream on the tape while the single pair of co-located heads passes over the tape for the $X^{th}$ time since the last pass over the tape during which data was recorded;
j) controlling the second head to record data from the reduced rate bit stream on the tape while the single pair of co-located heads passes over the tape for the $x^{th}$ time since the last pass over the tape during which data was recorded;
k) passing the single pair of co-located heads over the tape (x−1) times without recording data by continuing to rotate the headwheel at the preselected rotation rate; and
l) passing the single pair of co-located heads over the tape for an $x^{th}$ time after the last pass over the tape during which data was recorded;
m) repeating steps e through l.

A fourth method of recording data at a reduced rate on a tape will now be described with reference to FIG. 8. This method is applicable to digital VTRs where at least every other head location on the headwheel is populated with a co-located head.

Figure 8:
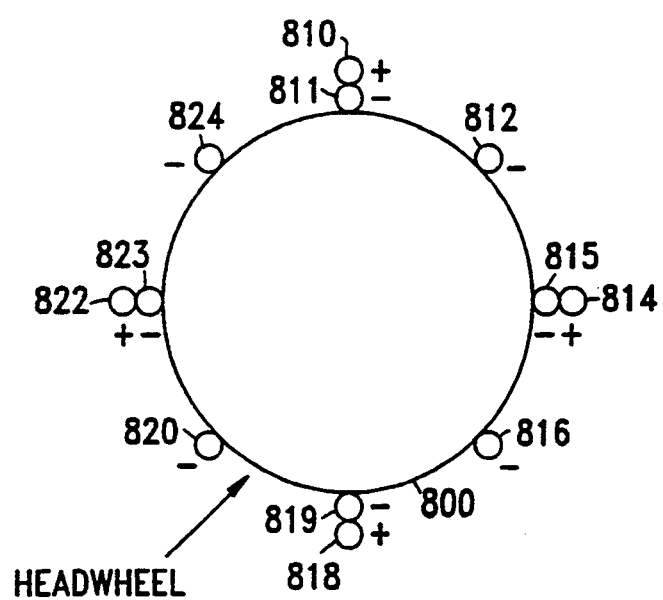
FIG. 8 is a representative diagram of a VTR head assembly which may be used in accordance with one embodiment of the present invention.

As illustrated in FIG. 8, a headwheel 800 may have, e.g., eight evenly distributed head locations each containing at least one head 810, 812, 814, 816, 818, 820, 822, 824. Furthermore, every other one of the head locations contains a second head 811, 815, 819, 823 which results in pairs of heads of opposite azimuth being located in four of the eight head locations.

Recording at a data rate of 1/x times the data rate of the full rate bit stream, where x is any positive integer, is achieved by performing the following steps of:

1. Rotating the headwheel at the normal rate of rotation.
2. Running the tape at a linear speed of 1/x the normal linear tape speed, where x is any positive integer.
3. Recording data using one of the colocated heads that is located adjacent to a non-colocated head, using the azimuth that is opposite that of the non-colocated heads or a head having an arbitrary azimuth if all head locations contain co-located heads.

4. Waiting until x−1 head locations have passed over the tape.
5. Recording a track using a head located at the next head location to pass over the tape. If this head is a non-colocated head, it will be of the correct azimuth, if this is a colocated head position, use the opposite azimuth from that recorded on the previous track.
6. Repeating steps 4 and 5.

Using this method and a headwheel arrangement with eight head positions, half of which contain a pair of colocated heads, as illustrated in FIG. 8, recording at a reduced data rate of 1/10 the normal data rate can be achieved. Recording at 1/10 the normal data rate in such a system as the one illustrated in FIG. 8, where H equals 8, is achieved by performing the following steps:

1. Rotating the headwheel at the normal rate of rotation.
2. Running the tape at a linear speed of 1/10 the normal linear tape speed.
3. Recording data using head 810 at positive azimuth.
4. Waiting until 9 heads have passed over the tape (1 full rotation of the headwheel plus an additional 45 degrees).
5. Recording a track using the next head 815. Since the previous track was written at positive azimuth, this track is written using negative azimuth.
6. Waiting until 9 heads have passed over the tape (1 full rotation of the headwheel plus an additional 45 degrees).
7. Recording a track using the next head.
8. Repeating steps 6 and 7.

Generally, the fourth recording method of the present invention is a method of operating a digital video tape recorder to record a reduced rate bit stream having a data rate of 1/x the data rate of a full rate bit stream on a tape, where x is a positive integer.

The fourth recording method can be used with a digital VTR that has a headwheel having H head locations located on the headwheel 360/H degrees apart, where each of the odd numbered head locations contains a pair of co-located heads including a first head of a first azimuth and a second head of a second azimuth, and each of the even numbered locations includes a head of the first azimuth. During standard mode VTR operation such a video tape recorder rotates the headwheel at a preselected rotation rate and moves the tape at a preselected normal play tape speed when recording a full rate bit stream. When applying the fourth method of recording a reduced rate bit stream to such a digital VTR, the fourth method of recording the reduced rate bit stream can be described as comprising the steps of:

a) positioning the tape in close proximity to the headwheel;
b) moving the tape around the headwheel at a speed of 1/x the preselected normal play tape speed;
c) rotating the headwheel at the preselected rotation rate, one of the H head locations beginning a pass over the moving tape during each (360/H) degree rotation of the headwheel, each of the H head locations passing over the moving tape on a diagonal relative to the length of the tape once during each complete 360 degree revolution of the headwheel;
d) passing a one of the odd numbered head locations over the tape by continuing to rotate the headwheel at the preselected rotation rate;
e) controlling the second head located at the one of the odd numbered head locations passing over the tape to commence recording of data from the reduced rate bit stream on the tape as the odd numbered head locations begins to pass over the tape and to continue recording the data on the tape until the one of the odd numbered head locations completes passing over the tape, while inhibiting the first head located at the one of the odd numbered head locations from recording on the tape;
f) continuing to rotate the headwheel at the preselected rotation rate to rotate the headwheel 360(x−1)/H degrees from the point recording was last commenced;
g) controlling the record heads to inhibit recording of data by any of the heads located in the H head locations that begin to pass over the tape as the tape rotates the 360(x−1)/H degrees from the point recording was last commenced;
h) continuing to rotate the headwheel at the preselected rotation rate to pass a next one of the H head locations located 360x/H degrees from the location of the head last used to record data on the tape, over the tape;
i) controlling the head of a differing azimuth from the azimuth of the head last used to record data, located at the next one of the H head locations, to commence recording data from the reduced rate bit stream on the tape when the next one of the H head locations begins to pass over the tape and to continue recording the data on the tape until the next one of the H head locations completes the pass over the tape, while inhibiting other heads at the next one of the H head locations from recording on the tape;
j) repeating steps f through i.

A fifth method of recording data at a reduced data rate on a tape will now be described with reference to FIG. 4. This method is applicable to digital VTRs where every head location on the digital VTR's headwheel is populated with H heads of opposite azimuth that are centered one track width apart from each other, where H is an even positive integer.

Referring now to FIG. 4, there is illustrated a headwheel arrangement suitable for use in accordance with the fifth data recording method of the present invention. The headwheel assembly illustrated in FIG. 4 includes a headwheel 600 with a single head location. In the embodiment of FIG. 4, H=8 and thus there are eight heads of alternating azimuth located one track width apart from each other. These heads include heads one through eight which are represented by the reference numerals 601, 602, 603, 604, 605, 606, 607 and 608, respectively. As illustrated, in this embodiment, the odd numbered heads 601, 603, 605, and 607 are of positive azimuth while the even numbered heads 602, 604, 606 and 608 are of negative azimuth.

Using the headwheel arrangement illustrated in FIG. 4, eight tracks are recorded on the tape during standard mode recording operation during each complete rotation of the headwheel. Since all the heads are used to record data during standard play operation, and the heads 601–608 are located one track width apart the eight tracks are recorded with the proper track spacing and with alternating azimuths during each revolution of the headwheel 600 during standard mode recording operation.

Additional sets of heads, i.e., H heads of opposite azimuth may be located at each of any plurality of uniformly distributed head locations on the headwheel 600. However, increasing the number of sets of heads merely requires a corresponding decrease in the head rotation speed as compared to when a single set of heads is used.

The discussion of recording method five of the present invention will be described in terms of the case where there is a single set of H heads of alternating azimuths located at a single location on the headwheel. With such a head configuration there are two possible methods of recording data at a reduced data rate while maintaining the same tape data density and headwheel rotation speed as used during standard mode VTR recording operation.

The first of these two methods which will be referred to as method 5a relies on skipping heads, e.g., using only selected heads for recording operations. The second recording method, referred to as method 5b, involves not recording during particular periods of headwheel rotation.

Recording method 5a will now be described. In accordance with this method recording a reduced rate bit stream having a data rate of 2m/H times the data rate of the full rate bit stream is possible, where m is a positive integer between 1 and H/2 , and where, as discussed above, H is an even positive integer representing the number of heads located at any one particular location on a headwheel.

Recording at a data rate of 2m/H times the full data rate is achieved by performing the following steps:
1. Rotating a headwheel at the normal rate of rotation.
2. Running the tape at a linear speed of 2m/H times the normal tape speed, wherein H is an even positive integer representing the number of heads located at a location on the headwheel and m is a positive integer between 1 and H/2.
3. Recording data on the tape using 2m adjacent heads on each pass of the heads over the tape.

For example, if the reduced rate bit stream had a data rate ¾ the data rate of the full rate bit stream, the reduced rate bit stream could be recorded on a tape using the headwheel arrangement illustrated in FIG. 4 by performing the following steps:
1. Rotating the headwheel 600 at the normal rate of rotation.
2. Running the tape at a linear speed of ¾ times the normal tape speed.
3. Recording data on the tape using six adjacent heads, e.g., head 1 through head 6, 601, 602, 603, 604, 605, 606 on each pass of the heads 601 through 608 over the tape.

Generally, recording method 5a is a method of operating a digital video tape recorder to record on the tape a reduced rate bit stream having a data rate of (2m/H) times the data rate of the full rate bit stream, where m is a positive integer between 1 and H/2, and where H is an even positive integer.

Recording method 5a can be used with a digital VTR including a headwheel having a series of H heads of alternating azimuths, where each of the H heads are centered one track width apart from each other and the series of H heads is located at a single location on the headwheel. During standard mode digital VTR recording operation the digital video tape recorder rotates the headwheel at a preselected rotation rate and moves the tape at a preselected normal play tape speed when recording the full rate bit stream. When applying recording method 5a to such a digital VTR recording method 5a for recording the reduced rate bit stream can be described as comprising the steps of:
 a) positioning the tape in close proximity to the headwheel;
 b) moving the tape around the headwheel at a speed of (2m/H) times the preselected normal play tape speed;
 c) rotating the headwheel at the preselected rotation rate, each of the H heads in the series of H heads passing over the moving tape on a diagonal relative to the length of the tape once during each complete 360 degree revolution of the headwheel;
 d) passing the series of H heads over the tape by continuing to rotate the headwheel at the preselected rotation rate;
 e) controlling a set of 2m adjacent heads of the series of H heads to record data from the reduced rate bit stream on the tape while the set of 2m adjacent heads pass over the tape and inhibiting the ones of the H heads not included in the set of 2m adjacent heads from recording data on the tape while the series of H heads passes over the tape;
 f) continuing to rotate the headwheel at the preselected rotation rate to rotate the headwheel 360 degrees from the point where the set of H heads began to pass over the tape;
 g) repeating steps d through f.

Recording method 5b will now be described. In accordance with recording method 5b, recording at a reduced data rate of 1/p times the data rate of a full rate bit stream is possible, where p is a positive integer, using a headwheel arrangement wherein a plurality of H heads of alternating azimuth are located at a head location on a VTR headwheel. In accordance with this method, recording at a data rate of 1/p times the standard data rate is achieved by performing the following steps:
1. Rotating a headwheel at the normal rate of rotation.
2. Running the tape at a linear speed of 1/p times the normal tape speed, wherein p is a positive integer.
3. Recording data on the tape using all the heads on the headwheel once for every p rotations of the head wheel.

For example, to achieve recording at a reduced data rate of 1/22 the data rate of a full rate bit stream using the headwheel 600 of FIG. 4, the following steps are to be performed:
1. Rotating the headwheel 600 at the normal rate of rotation.
2. Running the tape at a linear speed of ½ times the normal tape speed.
3. Recording data on the tape using all the heads 601, 602, 603, 604, 605, 606, 607, 608 on the headwheel once for every 2 complete rotations of the headwheel 600.

Generally, recording method 5b is a method of operating a digital video tape recorder to record on the tape a reduced rate bit stream having a data rate of (1/p) times the data rate of a full rate bit stream, where p is a positive integer and H is an even positive integers.

Recording method 5b can be used with a digital VTR including a headwheel having a series of H heads of alternating azimuths, where each of the H heads are centered one track width apart from each other and the series of H heads is located at a single location on the headwheel. During standard VTR recording mode operation the digital video tape recorder rotates the headwheel at a preselected rotation rate and moves the tape at a preselected normal play tape speed when recording the full rate bit stream. When applying recording method 5b to such a digital VTR, method 5b of recording a reduced rate bit stream on a tape, may be described as comprising the steps of:

a) positioning the tape in close proximity to the headwheel;

b) moving the tape around the headwheel at a speed of (1/p) times the preselected normal play tape speed;

c) rotating the headwheel at the preselected rotation rate, the series of H heads passing over the moving tape on a diagonal relative to the length of the tape once during each complete 360 degree revolution of the headwheel;

d) passing the series of H heads over the tape by continuing to rotate the headwheel at the preselected rotation rate;

e) controlling the H heads in the series of H heads to record data from the reduced rate bit stream on the tape while the series of H heads passes over the tape;

f) passing the series of H heads over the tape (p−1) times without recording data on the tape by continuing to rotate the headwheel at the preselected rotation rate;

g) passing the series of heads over the tape for a p time after the last pass over the tape during which data was recorded;

h) controlling the H heads in the series of H heads to record data from the reduced rate bit stream on the tape while the series of H heads passes over the tape for the p time since the last pass over the tape during which data was recorded; and i) repeating steps f through h.

Recording methods 5a and 5b can be combined to provide recording at various reduced data rates. The general reduced data rate at which data can be recorded when such a combination is employed, is expressed by the general equation 2m/Hp where m, H and p refer to the values defined above in regard to recording methods 5a and 5b.

For example, methods 5a and 5b can be combined and used in conjunction with the headwheel arrangement illustrated in FIG. 4. If such a combination is made recording at a reduced data rate of $\frac{3}{8}$ the data rate of a full rate bit stream can be achieved by using six adjacent heads out of the eight heads illustrated in FIG. 4, to support a reduction in the recording rate of $\frac{3}{4}$, and by recording data using the six heads only on every other rotation of the head wheel 600.

This recording on only every other rotation of the heads supports a further reduction of the data rate by $\frac{1}{2}$. Accordingly, by combining these two recording methods recording at $\frac{3}{8}$ the standard data rate is achieved ($\frac{3}{8}=\frac{3}{4}*\frac{1}{2}$) when the tape is run at $\frac{3}{8}$ the normal tape speed and the headwheel is rotated at the normal headwheel speed of rotation.

Such headwheel arrangements are particularly well suited for use in digital VTRs designed for recording HDTV because such a head arrangement permits multiple tracks, i.e., H tracks, to be recorded simultaneously on a tape. This provides a convenient method of supporting the high data rates that are necessary for recording digital HDTV transmissions.

The above methods of recording a full rate bit stream and a reduced rate bit stream may be employed to produce a VTR that can receive and record data streams having different data rates. In such an embodiment, the highest rate data stream the digital VTR is designed to receive would be treated as the full rate data stream. Data streams having a lower data rate than the full rate data stream would be treated as a reduced rate data stream and would be recorded in accordance with the above described methods for recording reduced rate data streams.

While the above described recording methods are described in terms of recording a reduced rate bit stream and a full rate bit stream, it is to be understood that the applicability of these recording methods is not limited to the case where a digital VTR generates a reduced rate bit stream from a received bit stream. The reduced data rate recording methods of the present invention may be used by a digital VTR to record data streams of different data rates that are received by a digital VTR of the present invention. In such a case, where the digital VTR receives bit streams of multiple data rates, the highest data rate the digital VTR is designed to record at is to be treated as the full data rate with all bit streams having a lower data rate are to be treated, by the digital VTR, as reduced rate bit streams.

For example, a digital VTR in accordance with the present invention could be designed to receive a first bit stream having a first data rate and a second bit stream having a data rate that is lower than the data rate of the first bit stream. In such a case, the first bit stream would be considered the full rate bit stream and the second bit stream the reduced rate bit stream. The second bit stream may be recorded using one of the above described recording methods of the present invention.

In addition to the above methods of recording a reduced rate bit stream on a tape, the present invention is also directed to methods of reading back data from a tape at less than the maximum data rate possible for a given head configuration. The playback methods of the present invention may be used to read back previously recorded from a tape at data rate that is a fraction of the full or maximum data rate possible. In the context of referring to VTR playback circuits in this patent application, the phrase full playback data rate is used to refer to the maximum data rate that can be read from a tape when rotating a headwheel, having the particular head arrangement being referred to, at a preselected rate of rotation and when moving the tape at a preselected normal play tape speed.

It should be noted that the phrase "pre-recorded data" is used to refer to data that was previously recorded on the tape in a series of tracks of alternating azimuths.

During standard playback operation of each of the video tape recorders described with regard to playback operation, the video tape recorders rotate the headwheel at a preselected rate of rotation and move the tape at a preselected standard play tape speed when reading pre-recorded data at the full data rate. The preselected rotation rate and preselected normal play tape speed supported by each digital VTR are, as with the case of the recording methods, a matter of design choice when implementing a digital VTR.

A first method for reading data which will now be referred to as playback method one, can be used with a digital VTR including a headwheel having an H number of heads of alternating azimuths uniformly distributed around the headwheel, where H is an even positive integer. During standard playback operation such a video tape recorder rotates the headwheel at a preselected rotation rate and moves the tape at a preselected normal play tape speed when reading pre-recorded data at the full data rate.

Playback method one of the present invention is a method for reading pre-recorded data at a data rate of $1/n^{th}$ the data rate of the full rate bit stream where n is a positive odd integer. Playback method one of the present invention for reading pre-recorded data from a tape at a reduced data rate can be described as comprising the steps of:

1. Rotating the headwheel at the preselected rate of rotation.
2. Moving the tape around the heedwheel at a linear speed of $1/n^{th}$ the preselected standard play tape speed.
3. Aligning the H heads with the pre-recorded tracks on the tape such that a one of the H heads is aligned with a track of the same azimuth as the one of the H heads.
4. Reading pre-recorded data from the tape whenever any of the H heads pass over the tape.
5. Commencing to select data read from the tape by the one of the H heads, as the one of the H heads begins to pass over the tape, for inclusion in the reduced rate data stream and continuing to select, for inclusion in the reduced rate data stream, data read by the one of the H heads while the one of the H heads continues to pass over the tape.
6. Continuing to rotate the headwheel $360(n-1)/H$ degrees from the point selection of data for inclusion in the reduced rate data stream was last commenced, while excluding from the reduced rate data stream data read by any of the H heads that begin to pass over the tape while the headwheel rotates the $360(n-1)/H$ degrees.
7. Continuing to rotate the headwheel at the preselected rate of rotation to reach a next one of the H heads located $360(n)/H$ degrees from the head that read the data that was last selected for inclusion in the reduced rate data stream.
8. Commencing to select data read from the tape by the next one of the H heads, as the next one of the H heads begins to pass over the tape, for inclusion in the reduced rate data stream and continuing to select, for inclusion in the reduced rate data stream, data read by the next one of the H heads while the next one of the H heads continues to pass over the tape.
9. Repeating steps 6 through 8.

In general terms, playback method one may be described as comprising the following steps:

1. Rotating the headwheel at the normal rate of rotation.
2. Running the tape at a linear speed of $1/n^{th}$ the normal tape speed, where n is any positive odd integer.
3. Reading data whenever one of the H heads passes over the tape.
4. Aligning the heads and tape such that a one of the heads is aligned with a track of the same azimuth as the one of the heads.
5. Selecting data read by the one of the heads for inclusion in the reduced rate data stream.
6. Ignoring data read from the tape by the next (n−1) heads to pass over the tape.
7. Selecting data, read from the tape by the next one of the H heads to pass over the tape, for inclusion in the reduced rate bit stream.
8. Repeating steps 6 and 7.

A second method for reading data which will now be referred to as the playback method 2, can be used with a digital VTR which has: a headwheel having heads of alternating azimuths uniformly distributed around a headwheel, at least one head centered at each one of the H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth.

Playback method two of the present invention is a method for reading pre-recorded data at a data rate of $2/xH$ the data rate of the full playback data rate, where x is a positive integer and H is an even positive integer. Playback method two of the present invention can be described, as comprising the steps of:

1. Rotating the headwheel at the preselected rate of rotation.
2. Moving the tape around the headwheel at a linear speed of $2/xH$ the preselected standard play tape speed.
3. Aligning the H heads with the pre-recorded tracks on the tape such that the at least one pair of co-located heads is aligned with a track of the first azimuth.
4. Reading pre-recorded data from the tape whenever one of the heads located in one of the H head locations passes over the tape.
5. Commencing to select data read from the tape by the first head of the at least one pair of co-located heads, as the at least one pair of co-located heads begins to pass over the tape and continuing to select, for inclusion in the reduced rate data stream, data read by the first head of the at least one pair of co-located heads while the at least one pair of colocated heads continues to pass over the tape and excluding data from the reduced rate data stream read by the second head of the at least one pair of co-located heads while the at least one pair of colocated heads passes over the tape.
6. Continuing to rotate the headwheel $(360/H)(xH/2-1)$ degrees from the point selection of data for inclusion in the reduced rate data stream was last commenced, while excluding from the reduced rate data stream data read by any of the heads located at the H head locations that begin to pass over the tape while the headwheel rotates the $(360/H)(xH/2-1)$ degrees.
7. Continuing to rotate the headwheel at the preselected rate of rotation to reach a next one of the H head locations, located $(360x/2)$ degrees from the head location that contains the head that read the data that was last selected for inclusion in the reduced rate data stream.
8. Commencing to select data read from the tape by a next head located at the next one of the H head locations having an azimuth that differs from the azimuth of the head last used to read data selected for inclusion in the reduced rate data stream and continuing to select, for inclusion in the reduced rate data stream, data read by the next head while the next one of the H head locations continues to pass over the tape;

9. Repeating steps 6 through 8.

In general terms, playback method two may be described as comprising the following steps:

1. Rotating the headwheel at the normal rate of rotation.
2. Running the tape at a linear speed of 2/xH the normal tape speed, where x is a positive integer, and H is the number of heads.
3. Reading data whenever one of the H heads passes over the tape.
4. Aligning the heads and tape such that if there is one head location that contains only a single head, a colocated head of the opposite azimuth from the single head located 180 degrees from the single head is aligned with a track of the azimuth that is opposite the azimuth of the single head. However, if all head locations contain co-located heads, a colocated head is aligned with a track of the same azimuth as the colocated head.
5. Selecting data from the colocated head for inclusion in the reduced rate bit stream.
6. Ignoring data read from the tape by the next (xH/2)-1 head locations to pass over the tape.
7. Selecting data read by the head located at the next head location for inclusion in the reduced data rate bit stream, using the azimuth that is opposite that of the previously included head.
8. Repeating steps 6 and 7.

A third method for reading data which will now be referred to as the playback method 3, can be used with a digital VTR that has a headwheel having a single pair of co-located heads mounted on a headwheel, the single pair of co-located heads including a first head of a first azimuth and a second head of a second azimuth.

Playback method three of the present invention is a method for reading pre-recorded data at a data rate of $1/x^{th}$ the data rate of the full data rate, where x is a positive integer. Playback method three of the present invention can be described, as comprising the steps of:

1. Rotating the headwheel at the preselected rate of rotation.
2. Moving the tape around the heedwheel at a linear speed of $1/x^{th}$ the preselected standard play tape speed, where x is a positive integer.
3. Aligning the single pair of co-located heads with one of the pre-recorded tracks of the first azimuth on the tape.
4. Reading pre-recorded data from the tape whenever the single pair of co-located heads passes over the tape.
5. Passing the single pair of co-located heads over the tape by continuing to rotate the headwheel at the preselected rate of headwheel rotation.
6. Selecting data, for inclusion in the reduced rate data stream, read from the tape by the first head while the single pair of co-located heads passes over the tape and excluding data read by the second head while the single pair of co-located heads passes over the tape.
7. Continuing to rotate the headwheel to pass the single pair of co-located heads over the tape $x-1$ times while excluding data read from the tape during the $x-1$ passes over the tape from being included in the reduced rate data stream.
8. Passing the single pair of co-located heads over the tape by continuing to rotate the headwheel at the preselected rate of headwheel rotation.
9. Selecting data, for inclusion in the reduced rate data stream, read from the tape by the second head while the single pair of co-located heads passes over the tape and excluding data read by the first head while the single pair of co-located heads passes over the tape.
10. Continuing to rotate the headwheel to pass the single pair of co-located heads over the tape $x-1$ times while excluding data read from the tape during the $x-1$ passes over the tape from being included in the reduced rate data stream.
11. Repeating steps 5 through 10.

In general terms, playback method three may be described as comprising the following steps:

1. Rotating the headwheel at the normal rate of rotation.
2. Running the tape at a linear speed of 1/x the normal tape speed, where x is a positive integer.
3. Reading data whenever the heads pass over the tape.
4. Aligning the head location of the pair of co-located heads with one of the tracks of a first azimuth recorded on the tape.
5. Selecting data from the first head for inclusion in the reduced rate bit stream, while ignoring data read from the tape by the second head.
6. Ignoring data read from the tape during the next $(x-1)$ rotations of the headwheel.
7. Selecting data read from the tape by the second head for inclusion in the reduced data rate bit stream, while ignoring data read from the tape by the first head.
8. Ignoring data read from the tape for the next $(x-1)$ rotations of the headwheel.
9. Repeating steps 5 through 8.

A fourth method for reading data which will now be referred to as playback method four, can be used with a digital VTR that has a headwheel having H head locations located on the headwheel 360/H degrees apart, where each of the odd numbered head locations contains a pair of co-located heads including a first head of a first azimuth and a second head of a second azimuth, and each of the even numbered locations includes a head of the first azimuth.

Playback method four of the present invention is a method for reading pre-recorded data at a data rate of 1/x the full playback data rate, where x is a positive integer. Playback method four of the present invention can be described, as comprising the steps of:

1. Rotating the headwheel at the preselected rate of rotation.
2. Moving the tape around the headwheel at a linear speed of 1/x the preselected standard play tape speed.
3. Aligning the heads and tape such that a one of the odd numbered head locations is aligned with a tape track of the second azimuth.
4. Reading prerecorded data from the tape whenever any of the H head locations pass over the tape.
5. Commencing to select data read from the second head of the one of the odd numbered head locations for inclusion in the reduced rate data stream and excluding data read by the first head of the one of the odd numbered head locations from the reduced rate data stream while the one of the odd numbered head locations passes over the tape.

6. Continuing to rotate the headwheel 360(x−1)/H degrees from the point selection of data for inclusion in the reduced rate data stream was last commenced, while excluding from the reduced rate data stream data read by any of the H head locations that begin to pass over the tape while the headwheel rotates the 360(x−1)/H degrees.

7. Continuing to rotate the headwheel at the preselected rate of rotation to pass a next one of the H head locations located 360x/H degrees from the head location that contains the head that read the data that was last selected for inclusion in the reduced rate data stream.

8. Commencing to select data read by a head of a differing azimuth from the azimuth of the head whose data was last selected for inclusion in the reduced rate data stream, located at the next one of the H head locations, and continuing to select the data from the head of a differing azimuth while the next one of the H head locations completes the pass over the tape;

9. Repeating steps 6 through 8.

In general terms, method four may be described as comprising the following steps:

1. Rotating the headwheel at the normal rate of rotation.
2. Running the tape at a linear speed of 1/x the normal tape speed, where x is any positive integer.
3. Aligning the heads and tape such that if at least one of the head locations contains a single head a one of the co-located heads that is located adjacent to the single head is aligned with a track on the tape having an azimuth opposite that of the adjacent single head, or if all head locations contain co-located heads align one of the co-located heads with a track on the tape having an arbitrary azimuth.
4. Selecting data from the head aligned with the track for inclusion in the reduced rate bit stream.
5. Ignoring data read from the tape by the heads located at the next (x−1) head locations to pass over the tape.
6. Selecting data read by the head having an azimuth opposite the azimuth of the head that read the data last included in the reduced rate data stream, located at the next head location to pass over the tape for inclusion in the reduced data rate bit stream.
7. Repeating steps 5 and 6.

Another method for reading data which will now be referred to as playback method 5a, can be used with a digital VTR that has a series of H heads of alternating azimuths, where each of the H heads are centered one track width apart from each other and the series of H heads is located at a single location on the headwheel.

Playback method 5a of the present invention is a method for reading pre-recorded data at a data rate of (2m/H) times the data rate of the full data rate, where m is a positive integer between 1 and H/2, and where H is an even positive integer. Playback method 5a of the present invention can be described, as comprising the steps of:

1. Moving the tape around the heedwheel at a linear speed of 2m/H times the preselected standard play tape speed.
2. Rotating the headwheel at the preselected rate of rotation, each of the H heads in the series of H heads passing over the moving tape on a diagonal relative to the length of the tape once during each complete 360 degree revolution of the headwheel.
3. Aligning a one of the H heads with one of the pre-recorded tracks on the tape such that the one of the H heads is aligned with a pre-recorded track on the tape of the same azimuth as the one of the H heads.
4. Reading pre-recorded data from the tape whenever one of the H heads passes over the tape.
5. Continuing to rotate the headwheel at the preselected rate to pass the series of H heads over the tape.
6. Commencing to select data read from the tape by a set of 2m adjacent heads of the series of H heads, as the series of H heads begins to pass over the tape, for inclusion in the reduced rate data stream, and continuing to select, for inclusion in the reduced rate data stream, data read by the set of the 2m adjacent heads while the set of 2m adjacent heads continues to pass over the tape.
7. Excluding data, read from the tape by the (H−2m) heads of the series of H heads not included in the set of 2m adjacent heads, from the reduced rate data stream.
8. Continuing to rotate the headwheel at the preselected rate of rotation to pass the series of H heads over the tape.
9. Commencing to select data, for inclusion in the reduced rate data stream, read from the tape by the set of 2m adjacent heads, as the series of H heads begins to pass over the tape, and continuing to select, for inclusion in the reduced rate data stream, data read by the set of the 2m adjacent heads while the set of 2m adjacent heads continues to pass over the tape.
10. Excluding data read from the tape by the (H−2m) heads of the set of H heads not included in the set of 2m adjacent heads from the reduced rate data stream.
11. Repeating steps 8 through 10.

In general terms, playback method 5a may be described as comprising the following steps:

1. Rotating a headwheel at the normal rate of rotation.
2. Running the tape at a linear speed of 2m/H times the normal tape speed, wherein H is a positive integer representing the number of heads located at a location on the headwheel and m is a positive integer between 1 and H/2.
3. Aligning the heads and tape such that the heads are aligned with with tracks of the same azimuths.
4. Reading data with all of the H heads.
5. Selecting data, read by 2m adjacent heads on each pass of the heads over the tape for inclusion in the reduced rate data stream.

Another method for reading data which will now be referred to as playback method 5b, can be used with a digital VTR that has a series of H heads of alternating azimuths, where each of the H heads are centered one track width apart from each other and the series of H heads is located at a single location on a headwheel.

Playback method 5b of the present invention is a method for reading pre-recorded data at a data rate of (I/p) times the full playback data rate, where p and H are positive integers. Playback method 5b of the present invention can be described, as comprising the steps of:

1. Moving the tape around the heedwheel at a linear speed of 1/p times the preselected standard play tape speed, where p is a positive integer.
2. Rotating the headwheel at the preselected rate of rotation, each of the H heads in the series of H heads passing over the moving tape on a diagonal relative to the length of the tape once during each complete 360 degree revolution of the headwheel.
3. Aligning a one of the H heads with one of the pre-recorded tracks on the tape such that the one of the H heads is aligned with a pre-recorded track on the tape of the same azimuth as the one of the H heads.
4. Reading pre-recorded data from the tape whenever a head passes over the tape.
5. Passing the series of H heads over the tape by continuing to rotate the headwheel at the preselected rate of headwheel rotation.
6. Selecting data, for inclusion in the reduced rate data stream, read from the tape by the heads in the series of H heads when the series of H heads passes over the tape.
7. Passing the series of H heads over the tape (p−1) times by continuing to rotate the headwheel at the preselected rate of headwheel rotation.
8. Excluding the data read from the tape by the heads in the series of H heads, as the series of H heads passes over the tape the (p−1) times from the reduced rate data stream.
9. Passing the series of H heads over the tape for a $p^{th}$ time by continuing to rotate the headwheel at the preselected rate.
10. Selecting data, for inclusion in the reduced rate data stream, read from the tape by the heads in the series of H heads when the series of H heads pass over the tape for the $p^{th}$ time.
11. Repeating steps 7 through 10.

In general terms, playback method 5b may be described as comprising the following steps:

1. Rotating the headwheel at the normal rate of rotation.
2. Running the tape at a linear speed of 1/p the normal tape speed, where p is a positive integer.
3. Aligning the heads and tape such that the heads are aligned with tracks of the same azimuths.
4. Selecting data from the heads for inclusion in the reduced rate data stream.
5. Ignoring data read from the tape for the next (p−1) rotations of the headwheel.
6. Repeating steps 4 and 5.

Referring again to the drawings, and to FIG. 6 in particular, there is illustrated a digital VTR recording circuit according to the present invention, generally indicated by the reference numeral 10. The VTR recording circuit 10 comprises an antenna 12, a tuner 14, an long play data processing circuit 16, a first switch 18, a data shuffling and framing circuit 22, and a tape speed motor control unit 24. In addition, the VTR recording circuit comprises a set of heads 26, and a pair of tape spindle wheels 30. The set of heads 26 are mounted on a headwheel and may be of any of the previously described headwheel arrangements illustrated in FIGS. 1–4. A tape 28 is illustrated as passing around the heads 26 and between the pair of tape spindle wheels 30.

The VTR recording circuit 10 receives a full rate video signal comprising both video and audio information via the antenna 12. The antenna 12 is coupled to the input of the tuner 14. In this manner the tuner 14 is supplied with the analog video signal. The tuner 14 may include an analog to digital converter in addition to other circuitry for converting the analog video signal to a digital video/audio data bit stream comprising encoded video and audio data, e.g., video transport data packets wherein each data packet may contain variable length encoded video codewords.

An audio/video data stream output of the tuner 14 is coupled to a first input of the switch 18 and a corresponding input of the long play data processing circuit 16. The long play data processing circuit 16 receives the audio/video data bit stream output by the tuner 14 and processes the data stream in accordance with one of the three data reduction methods of the present invention to generate a reduced rate bit stream.

The long play data processing circuit 16 comprises a syntax parser 42 that receives the video/audio data stream output by the tuner 14 via the input of the long play data processing circuit 16. In addition to the syntax parser 42, the long play data processing circuit 16 comprises a variable length decoder circuit 44, a requantizer circuit 46, a quantization scale factor reduction circuit 50, and a syntax reconstruction circuit 48.

The syntax parser 42 receives the video/audio data bit stream from the tuner and parses the received bit stream to generate a quantization scale factor signal indicative of the quantization scale of the received bit stream and further parses the bit stream to generate a parsed video data bit stream.

A parsed video data bit stream output of the syntax parser 42 is coupled to a corresponding input of the variable length decoder 44. The variable length decoder 44 decodes the parsed variable length encoded video bit stream into a stream of codewords. The codeword output of the variable length decoder 44 is coupled to a corresponding input of the requantizer circuit 46.

As illustrated in FIG. 6, the long play data processing circuit may include a data selection circuit 45 for prioritizing and selecting data from the full rate bit stream to be incorporated into the reduced rate bit stream. The data selection circuit 45 may be used in place of the requantization scale factor circuit 50 and requantization circuit 46. Alternatively, it may be used in conjunction with these circuits. In such an embodiment, the data selection circuit 45 would be located between the variable length decoder 44 and requantizer circuit 46.

The quantization scale factor reduction circuit 50 receives the quantization scale factor generated by the syntax parser 42 as an input signal and generates a first and second output signal therefrom. A first signal output of the quantization scale factor reduction circuit 50 is coupled to the input of the requantizer circuit 46 while a second signal output is coupled to an input of the Syntax reconstruction circuit 48. The quantization reduction circuit 50 stores information indicating how much the quantized scale factor of the received bit stream must be adjusted to achieve, through requantization, the amount of data reduction needed to generate the reduced rate bit stream.

The requantizer circuit 46 generates in response to the first signal output by the quantization reduction circuit 50, a reduced rate video data codeword stream that is supplied to a corresponding input of the syntax reconstruction circuit 48. The syntax reconstruction control circuit 48 receives the requantized video codeword data stream from the requantizer circuit 46 and a quantization scale factor control signal from the quantization scale factor reduction circuit 50. The syntax reconstruction circuit 48 processes the received video codeword data stream to generate a video/audio data bit stream that complies with the syntax constraints of the data format supported by the digital VTR recording circuit 10. The requantized and reconstructed video/audio data bit stream is supplied to the second input of the first switch 18.

The VTR command generator 20 receives, at a user command input, user commands which indicate, e.g., the VTR speed mode of operation a user has selected for VTR operation, for example, standard or long play modes of operation. These user commands may be input through, e.g., a VTR control panel that is coupled to the VTR command generator 20. The VTR command generator generates VTR control signals that are used to control the VTR speed mode of operation. The control signal output of the VTR command generator 20 is coupled to a control signal input of the switch 18, the tape speed motor control unit 24, and a recording mode signal input of a recording control circuit 37.

As will be described below, the recording control circuit 37 receives the signal output by the VTR command generator 20 and the data from the full or reduced rate bit stream that is to be recorded on the tape. The recording control circuit 37 is responsive to the signal output by the VTR command generator to supply the set of heads 26 with the data to be recorded on the tape and to control the heads to record the data in accordance with one of the above described recording methods when the signal received from the VTR command generator indicates the VTR recording circuit is operating in long play mode. Accordingly, the set of heads 26 are coupled to and controlled by the recording control circuit 37 to record data at the appropriate time as a function of the VTR mode of operation. Thus, for example, during long play mode operation, only some of the heads comprising the set of heads 26 may be used for recording data while all of the heads comprising the set of heads 26 may be used during standard play recording operation.

The switch 18 is responsive to the control signals received from the VTR command generator circuit 20 to couple either the normal play video data bit stream received at its first input or the long play video/audio data bit stream received at its second input to the input of the data shuffling and framing circuit 22. In this manner, VTR command generator 20, in response to user commands, controls whether the full rate normal play video bit stream or the reduced rate long play video data bit stream is supplied to the data shuffling and framing circuit 22 for recording on the tape 28.

The data shuffling and framing circuit 22 comprises a VTR framing and ECC circuit 40 and a data shuffling circuit 38. The input of the VTR framing and error correction code ("ECC") circuit 40 is coupled to the output of the switch 18. In this manner, the VTR framing and ECC circuit 40 receives the selected standard or long play video/audio data bit stream which it arranges into a series of video data blocks which contain error correction coding in addition to video and/or audio data.

A video data block output of the VTR framing and ECC circuit 40 is coupled to a corresponding input of the data shuffling circuit 38. The data shuffling circuit 38 reorders, i.e., shuffles, the video data blocks received from the VTR framing and ECC circuit 40 prior to recording on the video tape. The output of the data shuffling circuit 38 is coupled to a data input of the recording control circuit 37. The recording control circuit 37 is, in turn, coupled to the set of helical scan heads 26 which are mounted on a headwheel. During VTR recording operation, the set of heads 26 are controlled by the recording control circuit 37 to record the video data blocks output by the data shuffling circuit 38 on the tape 28 in accordance with one of the above described recording methods.

The VTR recording circuit's tape speed motor control unit 24 contains a plurality of tape speed motor control circuits with a separate tape speed motor control circuit being provided for each tape speed supported by the VTR recording circuit. Thus, the tape speed motor control unit 24 contains K tape speed motor control circuits where k represents the number of normal play modes of VTR operation supported by the VTR recording circuit. In the illustrated embodiment, the VTR recording circuit supports two tape speed modes of operation, i.e., standard play and long play. Accordingly, the tape speed motor control unit 24 comprises a normal play tape speed motor control circuit 34 and a long play tape speed motor control circuit 36.

The tape speed motor control unit 24 further comprises a switch 32 for coupling the output of either the normal play tape speed motor control circuit 34 or the long play tape speed motor control unit 36 to the tape spindle wheels 30. The switch 32 has a control signal input coupled to the output of the VTR command generator 20. Upon receiving a command signal indicating that the VTR is in normal play recording mode, the switch 32 couples the normal play tape speed motor control circuit 34 to the tape spindle wheels 30. In this manner, during normal play recording operation, the normal play tape speed motor control circuit 34 controls the speed of the tape spindles 30 and thus corresponding speed at which the tape moves around the heads 26. However, during long play operation, the switch 32 will couple the output of the long play tape speed motor control unit 36 to the tape spindles 30. Accordingly, during long play recording operation, the speed of the tape spindles 30 will be controlled to move the tape at the speed appropriate for long play operation which will generally be some fraction of the normal play tape speed.

Figure 7:
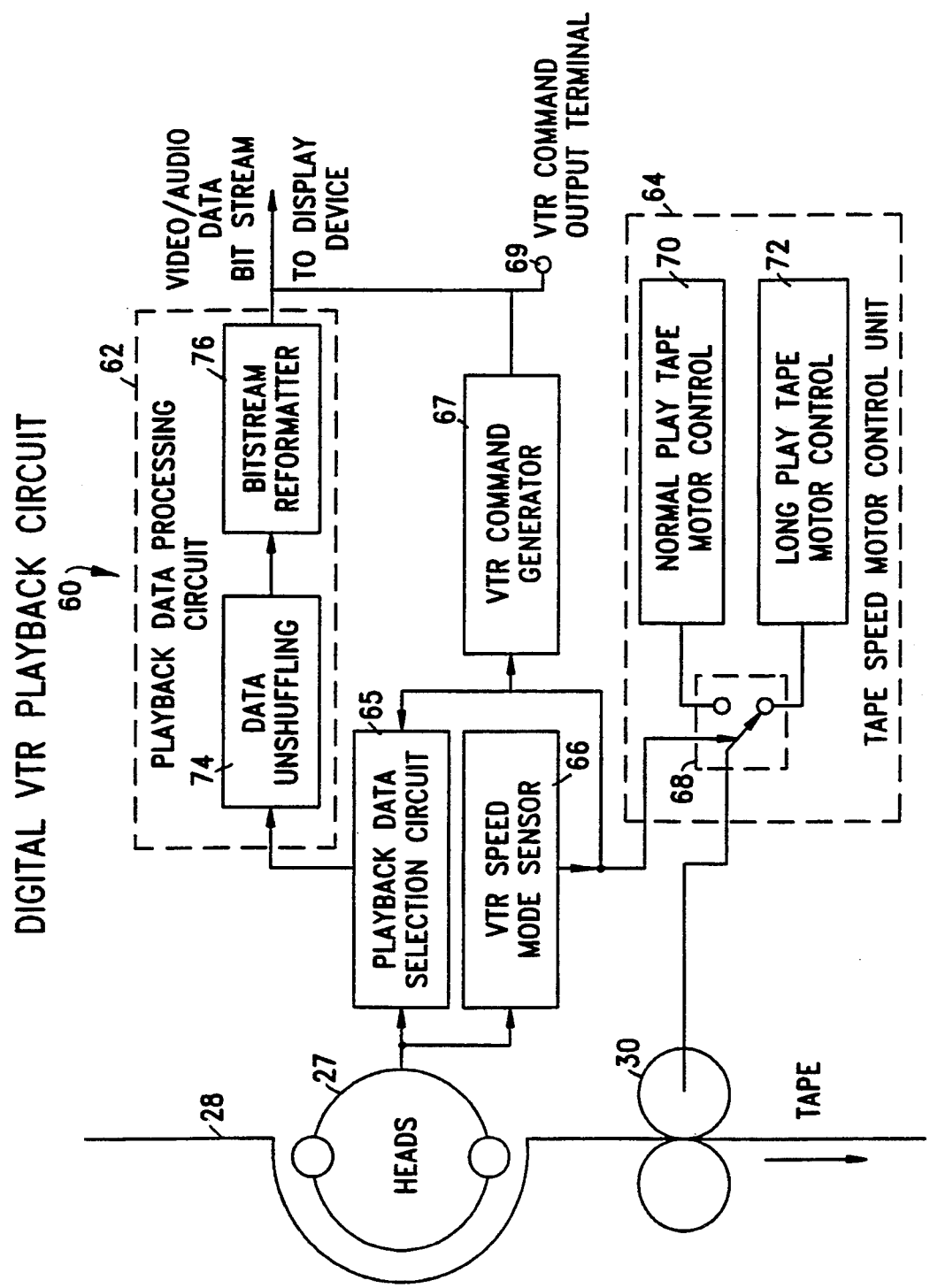
FIG. 7 is an exemplary schematic block diagram of a VTR playback circuit according to the present invention.

Referring now to FIG. 7, there is illustrated a digital VTR playback circuit according to the present invention generally indicated by the reference numeral 60. The VTR playback circuit 60 comprises a playback data processing circuit 62, a VTR speed mode sensor 66, a VTR tape speed motor control unit 64, tape spindles 30 and a set of helical scan read heads 27. These heads 27 may be arranged in a variety of ways, e.g., as illustrated in FIGS. 1-4 and FIG. 8. As illustrated in FIG. 7, during playback operation, the tape 28 passes around the read heads 27 and between the tape spindles 30 as a result of the rotation of the tape spindles 30.

The read heads 27 are coupled to the input of the playback data processing circuit 62 and the VTR speed mode sensor 66. By reading the data recorded on the tape 28 the read heads 27 generate a video data stream that is supplied to the input of the playback data processing circuit 62 and to the input of the VTR speed mode sensor 66 for processing. The VTR speed mode sensor 66 analyzes the data read from the tape to determine what particular speed mode of digital VTR operation, e.g., standard mode or long play mode of operation, the data is intended to be played back at. The VTR speed mode sensor may determine the correct speed mode from, e.g., a speed mode indicator recorded on the tape along with the video data or by analyzing the data to determine if the recorded data contains less information for a series of video frames than would be recorded if normal speed VTR operation was the intended mode of VTR operation.

The VTR speed sensor 66 has a VTR speed mode signal output coupled to a control input of the tape speed motor control unit 64, a VTR data processing command generator circuit 67, and a control circuit input of the heads 27. The VTR speed mode signal output may also be coupled to various other circuits within the VTR that require information concerning the VTR speed mode of operation, e.g., the playback data processing circuit 62.

The VTR command generator determines the mode in which the VTR is operating from the VTR speed mode signal. During long play mode operation the VTR command generator generates a signal indicating that the VTR is operating in long play mode. It may also generate commands instructing the receiver to perform video data processing on the data received during long play mode VTR operation to enhance the quality of the images generated by the receiver. The output of the VTR command generator 67 is coupled to a VTR command output terminal and/or the video/audio data bit stream output of the playback data processing circuit 62. Accordingly, a receiver coupled to the digital VTR playback circuit 62 of the present invention can receive a VTR mode signal and/or commands output by the VTR command generator 67 from either the video/audio data bit stream or from the VTR command output terminal 69.

The playback data selection circuit 65 is coupled to the outputs of both the set of heads 27 and the VTR speed mode sensor 66. Using the signal received from the VTR speed mode sensor 66, and information stored in the playback data selection circuit 65 concerning which of the heads that comprise the set of heads 27 are used during each mode of VTR operation supported by the VTR playback circuit 60, the playback data selection circuit 65 selects which heads will be used to supply data to the playback data processing circuit 62 at any given time.

The tape speed motor control unit 64 comprises a switch 68 and a series of k tape speed motor control circuits, where k corresponds to the number of normal play modes of operation supported by the VTR playback circuit 60 and wherein each tape speed motor control unit controls the tape spindle speed during a different VTR speed mode of operation. For example, in the embodiment illustrated in FIG. 2, the tape speed motor control unit 64 comprises a normal play tape speed motor control circuit 70 and a long play tape speed motor control unit 72.

The switch 68 has a first input terminal coupled to the output of the normal play tape speed motor control circuit 70 and a second input terminal coupled to the output of the long play tape speed motor control unit 72. In addition, the output of the VTR speed mode sensor 66 is coupled to a control input of the switch 68.

The switch 68 is responsive to the signal output by the VTR speed mode sensor 66 couples the output of the appropriate one of the tape speed motor control circuits 70, 72 to the tape spindles 30 so that the tape spindles 30 are controlled to rotate at a speed that will move the tape 28 at the proper speed for reading data from the tape 28.

The playback data processing circuit 62 comprises a data unshuffling circuit 74 and a bit stream reformatter circuit 76. The output of the set of read heads 27 is coupled to the input of the data unshuffling circuit 74. The data unshuffling circuit in turn has an output coupled to the input of the bit stream reformatter circuit 76. The data unshuffling circuit 74 receives the data read from the tape 28 and unshuffles the data blocks which are then supplied to the bit stream reformatter 76. The bit stream reformatter uses the ECC bits adapted by the VTR framing and ECC circuit at recording time 40 to correct error that occurred during the recording and reading of the data and also converts the blocks of data into a video/audio data bit stream format that can be readily processed and displayed by a display device, e.g., a video monitor or television set.

Generally, the VTR playback circuit of the present invention functions in a conventional manner during standard playback modes of operation. That is, the tape 28 is moved around a portion of the headwheel upon which the set of read heads 27 are mounted at the normal play tape speed with the tracks on the tape being aligned with the rotating heads 27 using a conventional servo mechanism. Data read from the tape 28, using the set of read heads 27, is supplied to the playback data processing circuit 60.

During long play modes of playback operation, the VTR speed mode sensor 66 determines the particular long play mode of operation supported by the playback circuit 60 that corresponds to the mode the data on the tape is intended to support. The appropriate long play tape motor control 72 is then selected by the VTR speed mode sensor 66 to control the speed of the tape spindles 30 and thus the speed of the tape 28 such that the tape will move at the appropriate speed which is some fraction of the normal play tape speed.

Because the playback data selection circuit 65 is informed by the speed mode sensor of the long play mode in which the VTR is operating, it is able to determine which of the heads that comprise the set of heads 27 should be used to read back the recorded data.

A conventional servo mechanism is used to align the recorded tracks on the tape 28 with the heads in the set of heads 27 that the playback data selection circuit 65 determines are to be used to read back the reduced rate data stream recorded on the tape 28.

The set of read heads 27, may comprise, e.g., a plurality of read heads arranged as illustrated in any of FIGS. 1–4 and FIG. 8. The methods of the present invention for reading reduced rate bit streams recorded on a tape for each of the head arrangements illustrated in FIGS. 1–4 and 8 are described above in greater detail.

I claim:

1. A method of operating a digital video tape recorder, capable of recording a full rate bit stream on a tape, to record on the tape a reduced rate bit stream having a data rate of 2/xH the data rate of the full rate bit stream, where x is a positive integer greater than one and H is an even positive integer, the digital video tape recorder including a headwheel having heads of alternating azimuths uniformly distributed around the outer edge of the headwheel, at least one head being located at each one of H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth, the digital video tape recorder rotating the headwheel at a preselected rotation rate and moving the tape at a preselected normal play tape speed when recording the full rate bit stream, the method of recording the reduced rate bit stream comprising the steps of:

a) positioning the tape in close proximity to the headwheel;

b) moving the tape around the headwheel at a speed of 2/xH the preselected normal play tape speed;

c) rotating the headwheel at the preselected rotation rate, one of the head locations beginning a pass over the moving tape during each (360/H) degree rotation of the headwheel, each of the H head locations passing over the moving tape on a diagonal relative to the length of the tape once during each complete 360 degree revolution of the headwheel;

d) passing the at least one pair of co-located heads over the tape for a first time by continuing to rotate the headwheel at the preselected rotation rate;

e) controlling the first head of the first azimuth of the at least one pair of co-located heads to commence recording data from the reduced rate bit stream on the tape as the first head begins to pass over the tape and to continue recording the data on the tape until the first head completes passing over the tape;

f) continuing to rotate the headwheel at the preselected rotation rate to rotate the headwheel (360/H)(xH/2−1) degrees from the point recording was last commenced;

g) controlling the record heads to inhibit recording of data by any of the record heads that begin to pass over the tape as the tape rotates the (360/H)(xH/2−1) degrees from the point recording was last commenced;

h) continuing to rotate the headwheel at the preselected rotation rate to begin passing a next one of the head locations, located on the headwheel (360x/2) degrees from the one of the recording locations where the head last used to record data on the tape is located;

i) controlling a next one of the heads located at the next one of the record head locations and having an azimuth differing from the azimuth of the last head used to record data on the tape, to commence recording data from the reduced rate bit stream on the tape using the next one of the heads when the next one of the heads begins to pass over the tape and to continue recording the data on the tape until the next one of the heads completes the pass over the tape;

j) repeating steps f through i.

2. The method of claim 1, further comprising the steps of:

receiving a full rate bit stream comprising compressed digital video data;

variable length decoding the received compressed digital video data to generate a full rate video codeword data stream;

performing data prioritization and data selection on the full rate video codeword data stream to generate a reduced rate video codeword data stream having a data rate (2x/H) times the data rate of the full rate video codeword data stream;

variable length encoding the reduced rate video codeword data stream to generate the reduced rate bit stream.

3. The method of claim 2, wherein the full rate video codeword data stream includes non-zero frequency I-picture, P-picture, and B-picture DCT coefficient data in a fixed ratio, and wherein the step of performing data prioritization and selection on the full rate video codeword data stream includes the step of selecting, in approximately the same fixed ratio as found in the full rate video codeword data stream, a subset of the non-zero frequency I-picture, P-picture and B-picture DCT coefficient data for inclusion in the reduced rate video codeword data stream.

4. The method of claim 1, further comprising the steps of:

receiving a full rate bit stream comprising compressed digital video data, the video data including a plurality of video codewords, each of the video codewords including data corresponding to a particular location within a picture;

generating the reduced rate bit stream by selecting a subset of the plurality of video codewords from the full rate bit stream, for inclusion in the reduced rate bit stream, said step of selecting the subset of the plurality of video codewords being performed as a function of the location within a picture to which the data in each video codeword corresponds.

5. The method of claim 4, wherein video codewords including data corresponding to the center portion of a video picture are selected at a higher rate than video codewords including data corresponding to the peripheral portions of a video picture.

6. The method of claim 1, further comprising the steps of:

receiving a full rate bit stream comprising compressed digital video data;

variable length decoding the received compressed digital video data to generate a full rate video codeword data stream;

performing requantization on the full rate video codeword data stream to generate a reduced rate video codeword data stream having a data rate of (2x/H) times the data rate of the full rate video codeword data stream;

variable length encoding the reduced rate video codeword data stream to generate the reduced rate bit stream.

7. The method of claim 6, wherein the step of performing requantization on the full rate video codeword data stream includes the steps of:

using a higher quantization scale factor when performing requantization on data representing portions of images located on the periphery of a video picture than is used when requantizing data representing portions of images located in the center of a video picture.

8. The method of claim 6, further comprising the step of:

adding a pseudo random dither pattern to the full rate video codeword data stream prior to the step of performing requantization.

9. The method of claim 3, further comprising the step of:

generating a signal indicating that the video tape recorder is operating in long play mode.

10. The method of claim 9, further comprising the step of:

incorporating the signal, indicating that the video tape recorder is operating in long play mode, into the reduced rate bit stream.

11. A method of operating a digital tape recorder, capable of recording a full rate bit stream on a tape, to record on the tape a reduced rate bit stream having a data rate of 2/xH the data rate of the full rate bit stream, where x is a positive integer and H is an even positive integer greater than two, the digital tape recorder including a headwheel having heads of alternating azimuths uniformly distributed around the outer edge of the headwheel, at least one head being located at each one of H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co,located heads containing a head of a second azimuth, the digital tape recorder rotating the headwheel at a preselected rotation rate and moving the tape at a preselected normal play tape speed when recording the full rate bit stream, the method of recording the reduced rate bit stream comprising the steps of:

a) positioning the tape in close proximity to the headwheel;

b) moving the tape around the headwheel at a speed of 2/xH the preselected normal play tape speed;

c) rotating the headwheel at the preselected rotation rate, one of the head locations beginning a pass over the moving tape during each (360/H) degree rotation of the headwheel, each of the H head locations passing over the moving tape on a diagonal relative to the length of the tape once during each complete 360 degree revolution of the headwheel;

d) passing the at least one pair of co-located heads over the tape for a first time by continuing to rotate the headwheel at the preselected rotation rate;

e) controlling the first head of the first azimuth of the at least one pair of co-located heads to commence recording data from the reduced rate bit stream on the tape as the first head begins to pass over the tape and to continue recording the data on the tape until the first head completes passing over the tape;

f) continuing to rotate the headwheel at the preselected rotation rate to rotate the headwheel (360/H)(xH/2−1) degrees from the point recording was last commenced;

g) controlling the record heads to inhibit recording of data by any of the record heads that begin to pass over the tape as the tape rotates the (360/H)(xH/2−1) degrees from the point recording was last commenced;

h) continuing to rotate the headwheel at the preselected rotation rate to begin passing a next one of the head locations, located on the headwheel (360x/2) degrees from the one of the recording locations where the head last used to record data on the tape is located;

i) controlling a next one of the heads located at the next one of the record head locations and having an azimuth differing from the azimuth of the last head used to record data on the tape, to commence recording data from the reduced rate bit stream on the tape using the next one of the heads when the next one of the heads begins to pass over the tape and to continue recording the data on the tape until the next one of the heads completes the pass over the tape; j) repeating steps f through i.

12. The method of claim 11, wherein H=4 and x=1.

13. A method of operating a digital tape recorder, capable of recording digital data on tape at a first data rate, to record the digital data on the tape at a second data rate that is 2/xH the first data rate, where x is a positive integer greater than one and H is an even positive integer, the digital tape recorder including a headwheel having heads of alternating azimuths uniformly distributed around the outer edge of the headwheel, at least one head being located at each one of H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth, the tape digital recorder rotating the headwheel at a preselected rotation rate and moving the tape at a preselected normal play tape speed when recording digital data at the first rate, the method of recording the reduced rate bit stream comprising the steps of:

a) positioning the tape in close proximity to the headwheel;

b) moving the tape around the headwheel at a speed of 2/xH the preselected normal play tape speed;

c) rotating the headwheel at the preselected rotation rate, one of the head locations beginning a pass over the moving tape during each (360/H) degree rotation of the headwheel, each of the H head locations passing over the moving tape on a diagonal relative to the length of the tape once during each complete 360 degree revolution of the headwheel;

d) passing the at least one pair of co-located heads over the tape for a first time by continuing to rotate the headwheel at the preselected rotation rate;

e) controlling the first head of the first azimuth of the at least one pair of co-located heads to commence recording data on the tape as the first head begins to pass over the tape and to continue recording the data on the tape until the first head completes passing over the tape;

f) continuing to rotate the headwheel at the preselected rotation rate to rotate the headwheel (360/H)(xH/2−1) degrees from the point recording was last commenced;

g) controlling the record heads to inhibit recording of data by any of the record heads that begin to pass over the tape as the tape rotates the (360/H)(xH/2−1) degrees from the point recording was last commenced;

h) continuing to rotate the headwheel at the preselected rotation rate to begin passing a next one of the head locations, located on the headwheel (360x/2) degrees from the one of the recording locations where the head last used to record data on the tape is located;

i) controlling a next one of the heads located at the next one of the record head locations and having an azimuth differing from the azimuth of the last head used to record data on the tape, to commence recording data on the tape using the next one of the heads when the next one of the heads begins to pass over the tape and to continue recording the data on the tape until the next one of the heads completes the pass over the tape; j) repeating steps f through i.

14. A method of operating a digital tape recorder, capable of recording a full rate bit stream on a tape, to record on the tape a reduced rate bit stream having a data rate of 2/xH the data rate of the full rate bit stream, where x is a positive integer and H is an even positive integer greater than two, the digital tape recorder including a headwheel having heads of alternating azimuths uniformly distributed around the outer edge of the headwheel, at least one head being located at each one of H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth, the tape digital recorder rotating the headwheel at a preselected rotation rate and moving the tape at a preselected normal play tape speed when recording the full rate bit stream, the method of recording the reduced rate bit stream comprising the steps of:

a) positioning the tape in close proximity to the headwheel;

b) moving the tape around the headwheel at a speed of 2/xH the preselected normal play tape speed;

c) rotating the headwheel at the preselected rotation rate, one of the head locations beginning a pass over the moving tape during each (360/H) degree rotation of the headwheel, each of the H head locations passing over the moving tape on a diagonal relative to the length of the tape once during each complete 360 degree revolution of the headwheel;

d) passing the at least one pair of co-located heads over the tape for a first time by continuing to rotate the headwheel at the preselected rotation rate;

e) controlling the first head of the first azimuth of the at least one pair of co-located heads to commence recording data from the reduced rate bit stream on the tape as the first head begins to pass over the tape and to continue recording the data on the tape until the first head completes passing over the tape;

f) continuing to rotate the headwheel at the preselected rotation rate to rotate the headwheel (360/H)(xH/2−1) degrees from the point recording was last commenced;

g) controlling the record heads to inhibit recording of data by any of the record heads that begin to pass over the tape as the tape rotates the (360/H)(xH/2−1) degrees from the point recording was last commenced;

h) continuing to rotate the headwheel at the preselected rotation rate to begin passing a next one of the head locations, located on the headwheel (360x/2) degrees from the one of the recording locations where the head last used to record data on the tape is located;

i) controlling a next one of the heads located at the next one of the record head locations and having an azimuth differing from the azimuth of the last head used to record data on the tape, to commence recording data from the reduced rate bit stream on the tape using the next one of the heads when the next one of the heads begins to pass over the tape and to continue recording the data on the tape until the next one of the heads completes the pass over the tape;

j) repeating steps f through i.

* * * * *